(12) United States Patent
Yoshida

(10) Patent No.: US 10,698,549 B2
(45) Date of Patent: Jun. 30, 2020

(54) POSITION INPUT DEVICE

(71) Applicant: Sharp Kabushiki Kaisha, Sakai, Osaka (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/351,656

(22) Filed: Mar. 13, 2019

(65) Prior Publication Data
US 2019/0294273 A1 Sep. 26, 2019

(30) Foreign Application Priority Data

Mar. 26, 2018 (JP) .................. 2018-058356

(51) Int. Cl.
G06F 3/041 (2006.01)
G06F 3/044 (2006.01)
G02F 1/13357 (2006.01)
G02F 1/1333 (2006.01)

(52) U.S. Cl.
CPC .......... *G06F 3/044* (2013.01); *G02F 1/13338* (2013.01); *G02F 1/133602* (2013.01); *G06F 3/0416* (2013.01)

(58) Field of Classification Search
CPC .......... G06F 3/044; G06F 2203/04103; G06F 3/0416; G06F 2203/04111; G06F 2203/04102; G06F 3/041; G06F 3/0418; G06F 3/047; G06F 3/04164; G02F 1/13338; G02F 1/133345; G02F 1/136209; G02F 2001/136263; G02F 1/136259; G02F 2001/134372; G02F 1/1309; H01L 27/3276; G09G 2300/0426
USPC .................................. 345/173–175
See application file for complete search history.

(56) References Cited

U.S. PATENT DOCUMENTS

| 2010/0007615 A1* | 1/2010 | Wu ........................ G06F 3/0418 345/173 |
| 2011/0186742 A1 | 8/2011 | Okada |
| 2012/0229395 A1* | 9/2012 | Shin ...................... G06F 3/0418 345/173 |
| 2015/0348480 A1* | 12/2015 | Ishibashi .............. G09G 3/3648 345/206 |

(Continued)

FOREIGN PATENT DOCUMENTS

JP 2011-159744 A 8/2011

*Primary Examiner* — Duc Q Dinh
(74) *Attorney, Agent, or Firm* — Keating & Bennett, LLP

(57) ABSTRACT

A position input device includes a position detecting electrode forming a capacitance with a position input body and detecting an input position input by the body, a position detection line connected to the position detecting electrode, a line, a first connection-enabling portion disposed overlapping a part of the position detecting electrode and one end side of the line, and being insulated by an insulating film from the part of the position detecting electrode and/or the one end side of the line, a signal input portion connected to another end side of the position detection line, and a second connection-enabling portion disposed overlapping the other end side of the position detection line and another end side of the line. The second connection-enabling portion is insulated by an insulating film from the other end side of the position detection line and/or the other end side of the line.

15 Claims, 13 Drawing Sheets

(56) References Cited

U.S. PATENT DOCUMENTS

| | | | |
|---|---|---|---|
| 2016/0170544 A1* | 6/2016 | Wang | G06F 3/0412 |
| | | | 345/173 |
| 2017/0249050 A1* | 8/2017 | Xi | G06F 3/0412 |
| 2017/0269446 A1* | 9/2017 | Sang | G06F 3/044 |

* cited by examiner

FIG.6
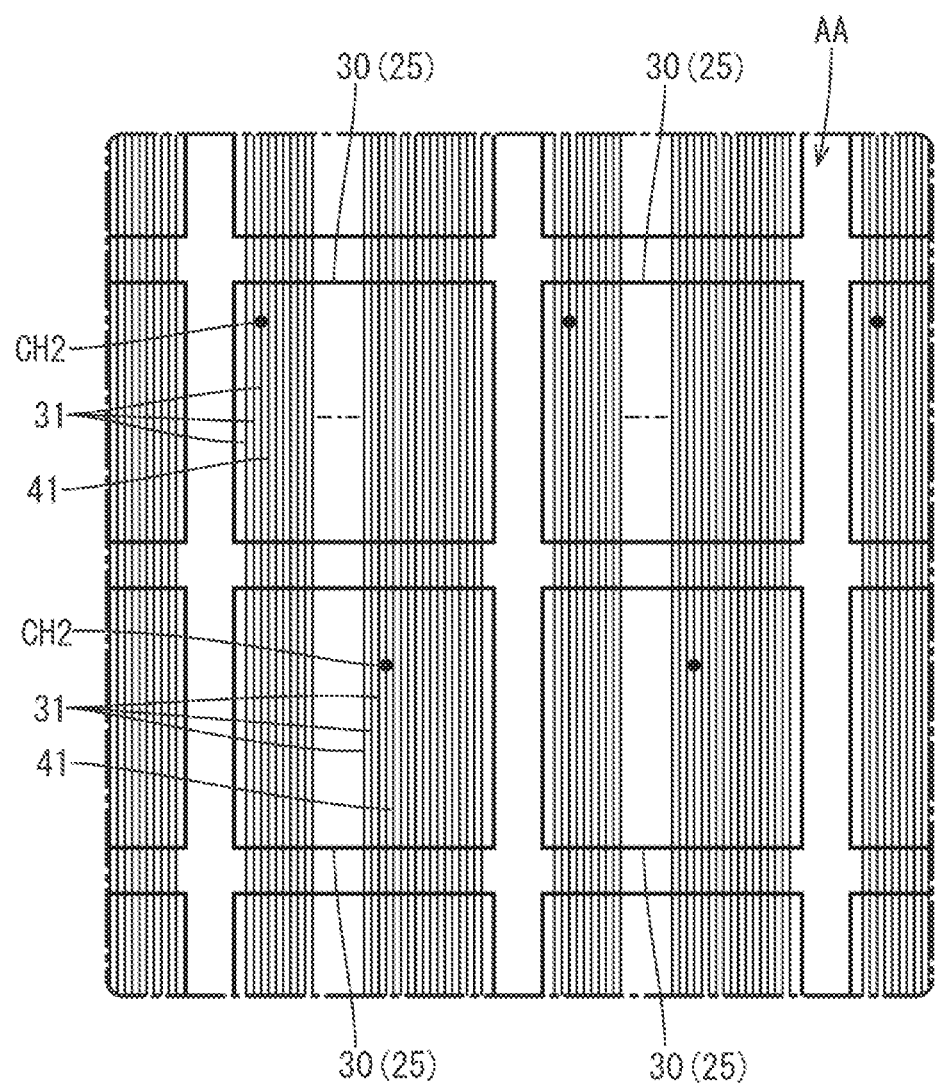
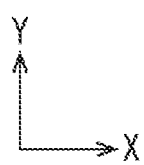

POSITION INPUT DEVICE

CROSS REFERENCE TO RELATED APPLICATION

This application claims priority from Japanese Patent Application No. 2018-058356 filed on Mar. 26, 2018. The entire contents of the priority application are incorporated herein by reference.

TECHNICAL FIELD

The technology described herein relates to a position input device.

BACKGROUND

According to a conventional technique for repairing a defect caused in a line in a radiographic imaging device, a signal line with a defect is short-circuited with a storage capacitor line which is parallel with the signal line, using pixels connected to the signal line across the defect portion, thereby forming a parallel circuit parallel with the defect portion.

In such a device, the storage capacitor line used for repairing the signal line having the defect is normally connected to a charge storage capacitor which is an electric element. Accordingly, when repairing the signal line, it is necessary to perform a process of electrically separating the storage capacitor line from the charge storage capacitor, and to then perform a process of connecting the storage capacitor line to the signal line. These processes involve a laser light irradiation process performed in the vicinity of the pixels. Thus, the risk of causing a secondary defect, such as a short-circuit, in the pixels is high.

SUMMARY

The technology described herein was made in view of the above circumstances. An object is to avoid troubles associated with a repair.

A position input device according to the technology described herein includes: a position detecting electrode which forms a capacitance between the position detecting electrode and a position input body configured to make a position input, and which detects an input position due to the position input body; a position detection line of which one end side is connected to the position detecting electrode; a line parallel with the position detection line; a first connection-enabling portion which is disposed so as to overlap a part of the position detecting electrode and one end side of the line, and which is insulated by an insulating film with respect to at least one of the part of the position detecting electrode and the one end side of the line; a signal input portion connected to another end side of the position detection line; and a second connection-enabling portion which is disposed so as to overlap the other end side of the position detection line and another end side of the line, and which is insulated by an insulating film with respect to at least one of the other end side of the position detection line and the other end side of the line.

In this way, the position detection line has one end side thereof connected to the position detecting electrode and the other end side thereof connected to the signal input portion. Accordingly, a signal input from the signal input portion can be supplied to the position detecting electrode. The position detecting electrode forms a capacitance between the position detecting electrode and the position input body for making a position input, so that it is possible to detect an input position due to the position input body. When a disconnection has occurred in the position detection line, a repair can be performed using the line parallel with the position detection line. The line has one end side overlapping the first connection-enabling portion and the other end side overlapping the second connection-enabling portion. The first connection-enabling portion overlapping one end side of the line also overlaps a part of the position detecting electrode, and is insulated by an insulating film with respect to at least one of a part of the position detecting electrode and one end side of the line. Accordingly, by subjecting the portion insulated by the insulating film to a process such as laser light irradiation, the position detecting electrode and the line can be electrically connected by the first connection-enabling portion. The second connection-enabling portion overlapping the other end side of the line also overlaps the other end side of the position detection line, and is insulated by an insulating film with respect to at least one of the other end side of the position detection line and the other end side of the line. Accordingly, by subjecting the portion insulated by the insulating film to a process such as laser light irradiation, the position detection line and the line can be electrically connected by the second connection-enabling portion. Thus, the signal input to the signal input portion is transferred from the other end side of the position detection line to the other end side of the line via the second connection-enabling portion, and supplied from one end side of the line to the position detecting electrode via the first connection-enabling portion.

If, as in the past, one end side of the line is connected to an electric element other than the position detecting electrode, it is necessary to perform a process of electrically separating one end side of the line and the electric element from each other, and then perform a process of connecting one end side of the line to the position detecting electrode. These processes are performed in close proximity, increasing the probability of causing a secondary trouble associated with the processes. In this respect, according to the above-described configuration, a process is performed separately on one end side of the line and the other end side thereof, and the portions subjected to the processes are dispersed. Accordingly, the probability of causing a secondary trouble associated with the processes can be reduced. In addition, compared to a case in which one end side of the line were connected to a part of the position detecting electrode in advance, and the other end side were connected to the signal input portion in advance, where redundancy is achieved by supplying the same signal of the position detection line to the position detecting electrode, the other end side of the line is not necessarily required to be connected to the signal input portion. Accordingly, the arrangement space is reduced in the vicinity of the signal input portion, and a decrease in frame width and an increase in resolution can be achieved in a preferable manner. In addition, in the configuration in which the position detecting electrodes are arranged forming a column, when a disconnection has occurred in any one of the position detection lines corresponding to the position detecting electrodes forming the column, a repair for the disconnection can be performed using the corresponding one line. That is, it is possible to repair the disconnection in the position detection lines within the number of the lines, even when the same number of lines as that of the position detection lines is not provided. Thus, it becomes possible to reduce the number of lines compared to if redundancy is achieved as described above.

According to the technology described herein, it is possible to avoid troubles associated with a repair.

BRIEF DESCRIPTION OF THE DRAWINGS

FIG. 6 is a plan view of the touch electrodes, touch lines, and spare touch lines of the liquid crystal panel.

DETAILED DESCRIPTION

First Embodiment

Figure 1:
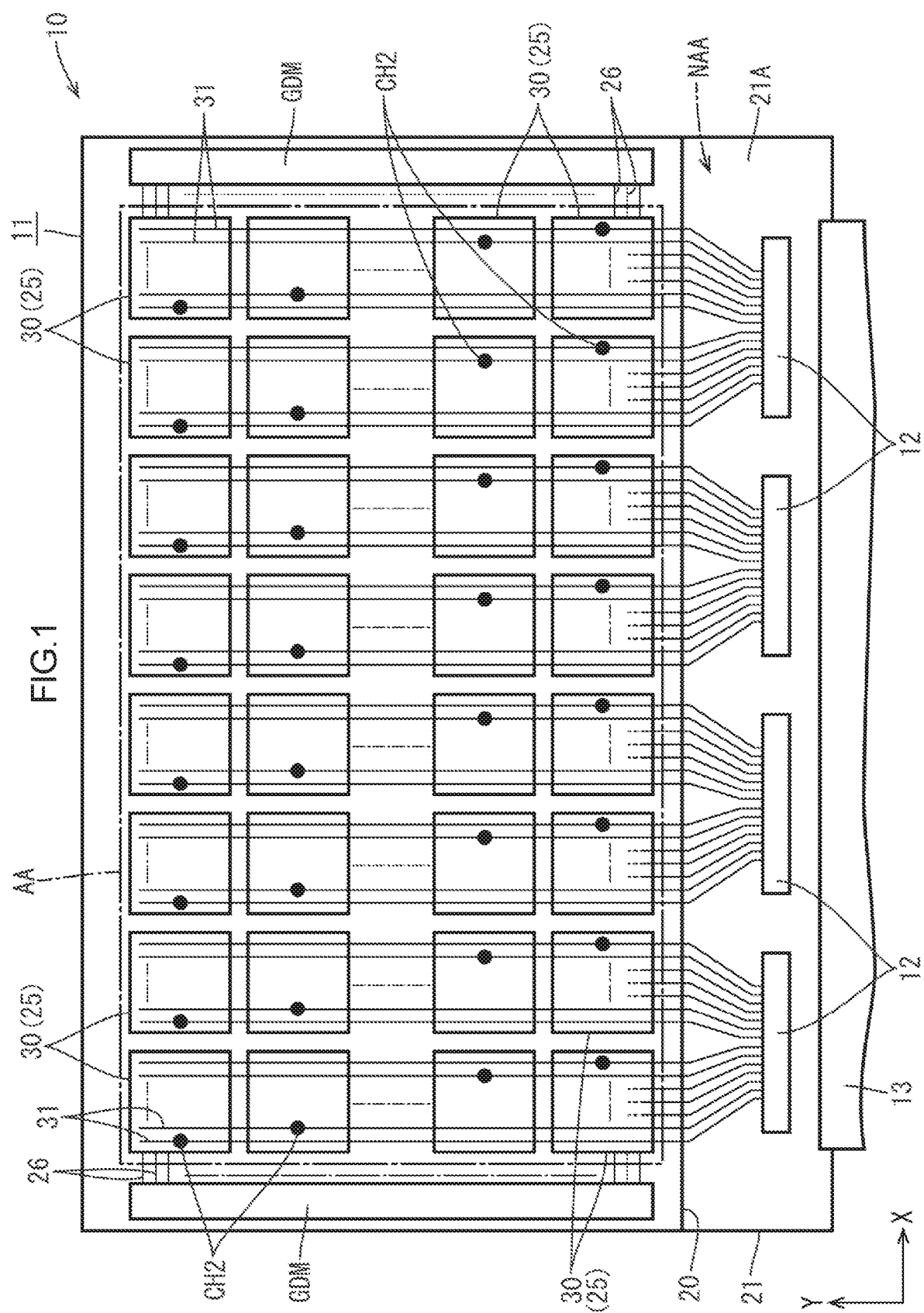
FIG. 1 is a plan view of touch electrodes, touch lines and the like of a liquid crystal panel provided in a liquid crystal display device according to a first embodiment.

A first embodiment will be described with reference to FIGS. 1 to 9. In the present embodiment, a liquid crystal display device (position input function-equipped display device) 10 provided with a display function and a touch panel function (position input function) will be described by way of example. In a part of each of the drawings, the X-axis, the Y-axis, and the Z-axis are illustrated, the axial directions corresponding to the directions indicated in the drawings. With reference to FIG. 3, FIG. 5, FIG. 7, and FIG. 9, the top corresponds to the upper side and the bottom corresponds to the lower side.

FIG. 1 is a schematic plan view of a liquid crystal panel 11. The liquid crystal display device 10, as illustrated in FIG. 1, has a horizontally long quadrangular shape, and is provided with at least: the liquid crystal panel (position input device, position input function-equipped display panel) 11 configured to display an image; and a backlight device (lighting device) which is an external light source for irradiating the liquid crystal panel 11 with light for a display. In the present embodiment, the liquid crystal panel 11 has a screen size of 16 inches (specifically, 16.1 inches), for example, and a resolution corresponding to "full high-definition" (FHD). The backlight device is disposed on the lower side (back side) with respect to the liquid crystal panel 11, and includes a light source that emits light (white light) with the color of white (such as LEDs), and optical members and the like for providing the light from the light source with an optical action to thereby convert the light into planar light. Illustration of the backlight device is omitted.

The liquid crystal panel 11, as illustrated in FIG. 1, has a screen of which the central portion is a display region (in FIG. 1, the area surrounded by dashed and single-dotted lines) AA for displaying an image. The screen of the liquid crystal panel 11 also includes a frame-like portion, surrounding the display region AA, which is a non-display region NAA in which no image is displayed. The liquid crystal panel 11 includes a pair of substrates 20, 21 joined together. The pair of substrates 20, 21 includes a CF substrate (counter substrate) 20 on the upper side (front side), and an array substrate (active matrix substrate, element substrate) 21 on the lower side (back side). Each of the CF substrate 20 and the array substrate 21 is formed of a glass substrate with various films laminated on an inner surface side thereof. A polarizing plate is affixed to the outer surface side of each of the substrates 20, 21. The CF substrate 20 has a short-side dimension smaller than a short-side dimension of the array substrate 21. The CF substrate 20 is joined to the array substrate 21 with one ends thereof in the short-side direction (the Y-axis direction) aligned with each other. Thus, the other end in the short-side direction of the array substrate 21 protrudes laterally with respect to the CF substrate 20, forming a CF substrate non-overlapping portion 21A that does not overlap the CF substrate 20. In the CF substrate non-overlapping portion 21A, drivers (drive circuit part) 12 and a flexible substrate (signal transmission part) 13 are mounted. The drivers 12 supply various signals relating to a display function and a touch panel function, which will be described later. The drivers 12 each include an LSI chip with an internal drive circuit, and are mounted on the array substrate 21 using Chip-On-Glass (COG) technology. The drivers 12 process various signals transferred by the flexible substrate 13. In the present embodiment, four drivers 12 are disposed side by side at intervals in the X-axis direction in the non-display region NAA of the liquid crystal panel 11. The flexible substrate 13 includes a base material of insulating and flexible synthetic resin material (such as a polyimide resin), and a number of line patterns formed thereon. The flexible substrate 13 has one end side connected to the non-display region NAA of the liquid crystal panel 11, and the other end side connected to a control substrate (signal supply source). Various signals supplied from the control substrate are transferred via the flexible substrate 13 to the liquid crystal panel 11, processed by the drivers 12 in the non-display region NAA, and then output to the display region AA. In the non-display region NAA of the array substrate 21, a pair of gate circuit parts GDM is provided so as to sandwich the display region AA from both sides with respect to the X-axis direction. The gate circuit parts GDM are provided to supply a scan signal to gate lines 26, which will be described later.

The liquid crystal panel 11 according to the present embodiment has a display function for displaying an image, and a touch panel function for detecting a position (input position) at which a user has made an input based on the image being displayed. A touch panel pattern for implementing the touch panel function is integrated (in-cell technology). The touch panel pattern is of a projected capacitance technology, and uses a self-capacitive detection technology. The touch panel pattern, as illustrated in FIG. 1, includes touch electrodes (position detecting electrodes) 30 which are disposed side by side in a matrix in a plate surface of the liquid crystal panel 11. The touch electrodes 30 are disposed in the display region AA of the liquid crystal panel 11. Accordingly, the display region AA in the liquid crystal panel 11 substantially corresponds to a touch region (position input region) in which an input position can be detected, and the non-display region NAA substantially corresponds to a non-touch region (non-position input region) in which an input position cannot be detected. As the user, in an attempt to make a position input based on an image visible in the display region AA of the liquid crystal panel 11, brings his or her finger (position input body), which is an electrical conductor, closer to the surface (display surface) of the liquid crystal panel 11, a capacitance is formed between the finger and the touch electrodes 30. Thus, the capacitance detected by the touch electrodes 30 nearer to the finger changes as the finger approaches, and becomes different from the capacitance detected by the touch electrodes 30 farther from the finger. Accordingly, the input position can be detected based on the difference. The touch electrodes 30 are disposed side by side at intervals in the X-axis direction (the direction in which pixel electrodes 24 sandwiching touch lines 31 are arranged) and in the Y-axis direction (the direction in which the touch lines 31 extend), forming a matrix in the display region AA. The touch electrodes 30 when viewed in plan have a substantially quadrangular shape with each side having a dimension of the order of several millimeters (for example, approximately from 2 mm to 6 mm), preferably approximately 4.1 mm. Thus, the touch electrodes 30, as viewed in plan, have a size much greater than a pixel portion PX which will be described later, and are each arranged in an area spanning over a number (such as several tens) of pixel portions PX with respect to the X-axis direction and the Y-axis direction. Touch lines (position detection lines) 31 disposed in the liquid crystal panel 11 are selectively connected to the touch electrodes 30. The touch lines 31 extend in the Y-axis direction, and are selectively connected to specific touch electrodes 30 among the touch electrodes 30 arranged in the Y-axis direction. More specifically, in the present embodiment, the touch lines 31 are disposed so as to overlap each of columns formed by the touch electrodes 30 arranged in the Y-axis direction, and are each individually selectively connected to each of the touch electrodes 30 forming the column. In FIG. 1, the portions of the touch electrodes 30 to which the touch lines 31 are connected are indicated by dots. The touch lines 31 are also connected to a detection circuit. The detection circuit may be provided in the drivers 12, or may be provided outside the liquid crystal panel 11 with the flexible substrate 13 interposed therebetween. FIG. 1 is a schematic depiction of the arrangement of the touch electrodes 30. The specific number provided, arrangement, planar shape and the like of the touch electrodes 30 may be modified, as appropriate, from those illustrated.

Figure 2:
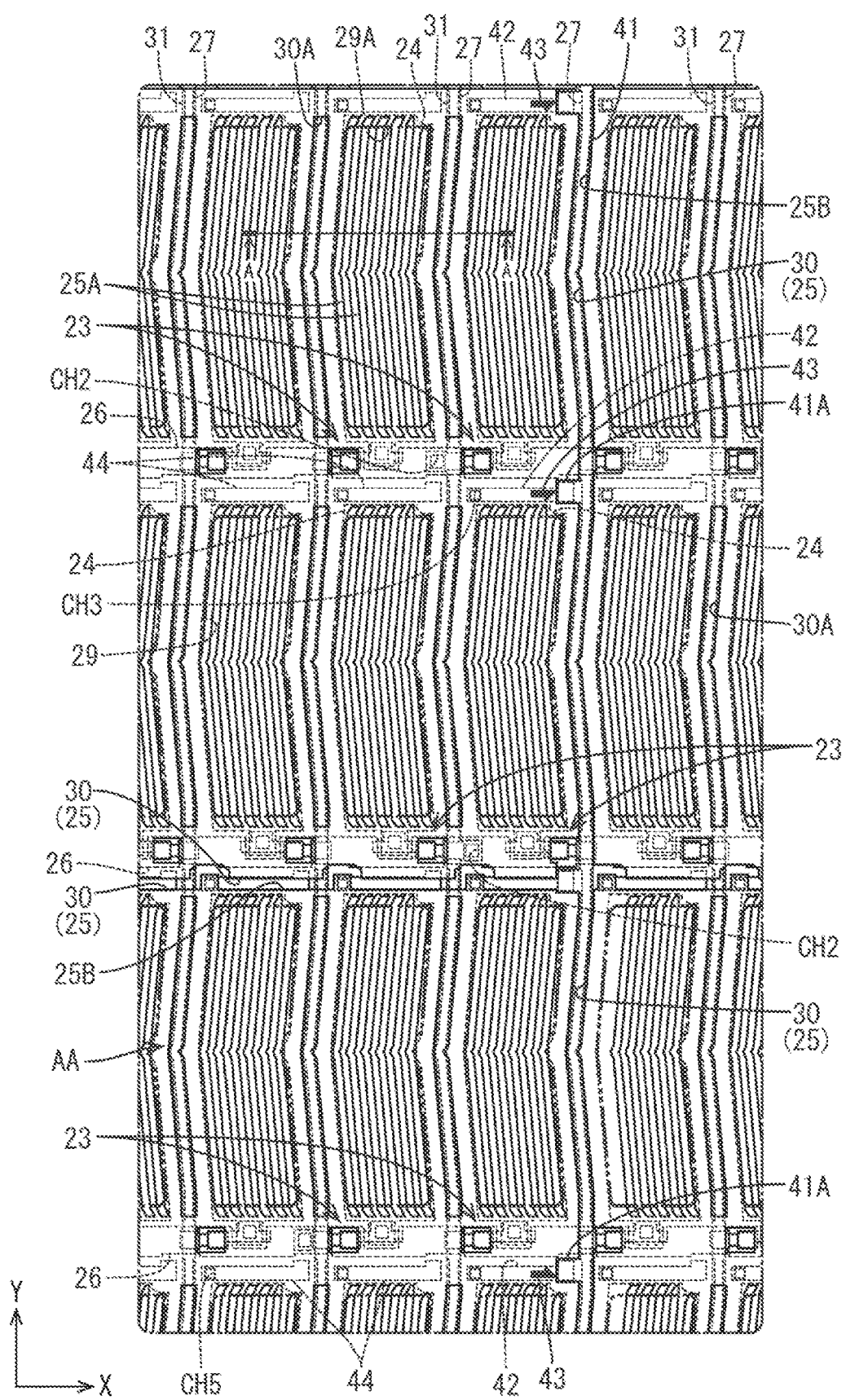
FIG. 2 is a plan view of a pixel arrangement of the liquid crystal panel.

FIG. 2 is a plan view of the array substrate 21 of the liquid crystal panel 11 in the display region AA. The touch electrodes 30, as illustrated in FIG. 2, include touch line-overlapping openings (position detection line-overlapping openings) 30A disposed so as to overlap a part of the touch lines 31. The touch electrodes 30 also include spare touch line-overlapping openings (line-overlapping openings) disposed so as to overlap a part of a spare touch line 41, which will be described later. In the present embodiment, a configuration is illustrated in which the spare touch line 41 is arranged between two touch electrodes 30 adjacent to each other in the X-axis direction (so as to overlap partitioning openings (partitioning slits) 25B which will be described later). Accordingly, illustration of the spare touch line-overlapping openings is omitted. The touch line-overlapping openings 30A and the spare touch line-overlapping opening each extend in parallel with the Y-axis direction, in which the touch lines 31 and the spare touch line 41 extend. The touch line-overlapping openings 30A and the spare touch line-overlapping opening, when viewed in plan, have a vertically long shape (a longitudinal shape having a longitudinal direction corresponding to the direction in which the touch lines 31 and the spare touch line 41 extend). The touch line-overlapping openings 30A and the spare touch line-overlapping opening have a width dimension (dimension with respect to the X-axis direction) greater than a width dimension of the touch lines 31 and the spare touch line 41. Thus, the touch line-overlapping openings 30A and the spare touch line-overlapping opening are disposed so as to respectively overlap at least a part of the touch lines 31 and the spare touch line 41. Accordingly, a parasitic capacity that can be produced between the touch lines 31 and the touch electrodes 30 and the spare touch line 41, which is not connected to the touch lines 31, is reduced. In this way, position detection sensitivity is improved.

On the inner surface side in the display region AA of the array substrate 21 of the liquid crystal panel 11, as illustrated in FIG. 2, thin-film transistors (TFTs; switching elements) 23 and pixel electrodes 24 are provided. The TFTs 23 and the pixel electrodes 24 are arranged at intervals in the X-axis direction and the Y-axis direction, forming a matrix (rows and columns). Around the TFTs 23 and the pixel electrodes 24, gate lines (scan lines) 26 and source lines (signal lines, data lines) 27 are disposed orthogonal to (intersecting) each other. The gate lines 26 extend generally in the X-axis direction, while the source lines 27 extend generally in the Y-axis direction. The gate lines 26 and the source lines 27 are respectively connected to a gate electrode 23A and a source electrode 23B of the TFTs 23, and the pixel electrodes 24 are connected to a drain electrode 23C of the TFTs 23. The TFTs 23 are driven based on various signals supplied to the gate lines 26 and the source lines 27, and control the supply of potentials to the pixel electrodes 24 in accordance with the driving. The TFTs 23 are disposed unevenly to the right and left in FIG. 2 in the X-axis direction with respect to the pixel electrodes 24 (source lines 27). The TFTs 23 include those disposed unevenly to the left with respect to the pixel electrodes 24 (source lines 27), and those disposed unevenly to the right with respect to the pixel electrodes 24 (source lines 27). The TFTs 23 on the left and the TFTs 23 on the right are arranged alternately and repeatedly with respect to the Y-axis direction, forming a zigzag (staggered) arrangement. The pixel electrodes 24 have a vertically long, substantially quadrangular planar shape (more specifically, the long side is bent to follow the source lines 27), of which the short-side direction is aligned with the direction in which the gate lines 26 extend and the long-side direction is aligned with the direction in which the source lines 27 extend. The pixel electrodes 24 are sandwiched from both sides by a pair of gate lines 26 with respect to the Y-axis direction, and are sandwiched from both sides by a pair of source lines 27 with respect to the X-axis direction. On the CF substrate 20 side, a light shield (pixel-to-pixel light shield, black matrix) 29 is formed, as indicated by dashed and double-dotted lines in FIG. 2. The light shield 29 has a substantially lattice-like planar shape partitioning adjacent pixel electrodes 24, and includes a pixel opening 29A in a position that, when viewed in plan, overlaps a major portion of the pixel electrodes 24. The pixel opening 29A allow light that has passed through the pixel electrodes 24 to exit the liquid crystal panel 11. The light shield 29 is arranged to overlap, when viewed in plan, at least the gate lines 26 and the source lines 27 (including the touch lines 31) on the array substrate 21 side. The arrangement and the like of the TFTs 23 and the pixel electrodes 24 will be described later.

Figure 3:
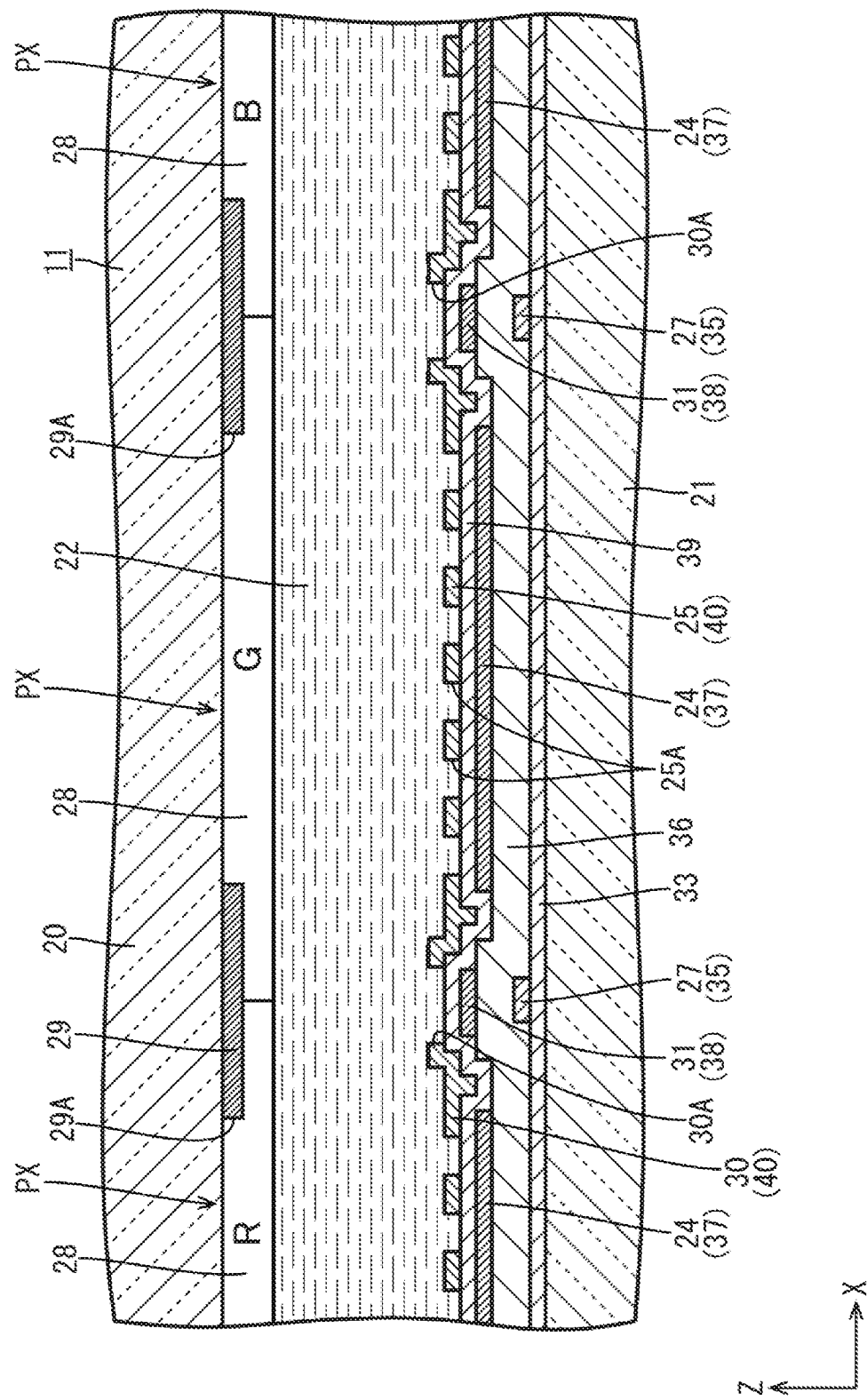
FIG. 3 is a cross section of the liquid crystal panel taken along line A-A of FIG. 2.

FIG. 3 is a cross section in the vicinity of the center of a pixel portion PX in the liquid crystal panel 11. The liquid crystal panel 11, as illustrated in FIG. 3, includes a liquid crystal layer (medium layer) 22 which is disposed between the pair of substrates 20, 21 and contains liquid crystal molecules which are a material of which the optical characteristics vary in response to an application of an electric field. In the display region AA on the inner surface side of the CF substrate 20 of the liquid crystal panel 11, color filters 28 of the three colors of blue (B), green (G), and red (R) are provided. A number of the color filters 28 having mutually different colors are arranged repeatedly along the gate lines 26 (the X-axis direction), and extend along the source lines 27 (generally the Y-axis direction), forming a striped arrangement overall. The color filters 28 are arranged so as to overlap, when viewed in plan, the pixel electrodes 24 on the array substrate 21 side. The color filters 28 disposed adjacent to each other with respect to the X-axis direction and producing mutually different colors are arranged with their boundary (color boundary) overlapping the source lines 27 and the light shield 29. In the liquid crystal panel 11, the color filters 28 for R, G, and B arranged in the X-axis direction, and the three pixel electrodes 24 respectively opposing the color filters 28 respectively constitute the pixel portions PX for the three colors. In the liquid crystal panel 11, display pixels with which it is possible to perform a color display of a predetermined grayscale are constituted by the pixel portions PX of the three colors of R, G, and B which are disposed adjacent to each other in the X-axis direction. The pixel portions PX have an arrangement pitch with respect to the X-axis direction of the order of 60 μm (specifically, 62 μm), for example, and an arrangement pitch with respect to the Y-axis direction of the order of 180 μm (specifically, 186 μm), for example. The light shield 29 is disposed so as to partition the adjacent color filters 28. On the upper-layer side (liquid crystal layer 22 side) of the color filters 28, a solid planarization film is provided across substantially the entire area of the CF substrate 20. An alignment film for aligning the liquid crystal molecules contained in the liquid crystal layer 22 is formed on an inner-most surface of each of the substrates 20, 21 that adjoins the liquid crystal layer 22.

The common electrode 25 will be described with reference to FIGS. 2 and 3. On the inner surface side in the display region AA of the array substrate 21, as illustrated in FIGS. 2 and 3, a common electrode 25 is formed in a layer over the pixel electrodes 24 so as to overlap all of the pixel electrodes 24. The common electrode 25 is supplied with a substantially constant reference potential at all times, except for a period (sensing period) in which a touch signal (position detection signal) is supplied and an input position due to a finger as a position input body is detected. The common electrode 25 extends across substantially the entire area of the display region AA, and includes portions overlapping the pixel electrodes 24 (specifically, pixel electrode body 24A which will be described later). In the portions overlapping the pixel electrodes 24, pixel overlap openings (pixel overlapping slits, alignment control slits) 25A are formed extending along the long side of the pixel electrodes 24. The specific number provided, shape, area of formation and the like of the pixel overlap opening 25A may be modified, as appropriate, from those illustrated. When a potential difference is caused between a pixel electrode 24 and the common electrode 25 overlapping each other as the pixel electrode 24 becomes charged, a fringe electric field (oblique electric field) which includes, in addition to a component along a plate surface of the array substrate 21, a component in a direction normal to the plate surface of the array substrate 21, is produced between an opening edge of the pixel overlap opening 25A and the pixel electrode 24. Thus, by utilizing the fringe electric field, it is possible to control the alignment state of the liquid crystal molecules included in the liquid crystal layer 22. That is, the liquid crystal panel 11 according to the present embodiment operates in a Fringe Field Switching (FFS) mode. The common electrode 25 constitutes the touch electrodes 30. The common electrode 25 includes, in addition to the pixel overlap opening 25A, partitioning openings (partitioning slits) 25B that partition adjacent touch electrodes 30. The partitioning openings 25B include portions laterally extending across the length of the common electrode 25 in the X-axis direction, and portions extending across the length of the common electrode 25 in the Y-axis direction, forming, when viewed in plan, a substantially lattice-like shape overall. In FIG. 2, the spare touch line 41 is illustrated overlapping the vertically extending portions of the partitioning openings 25B. The common electrode 25 includes the touch electrodes 30 which, when viewed in plan, are divided into a grid by the partitioning openings 25B and which are electrically independent from each other. Thus, the touch lines 31 connected to the touch electrodes 30 supply the touch electrodes 30 with a reference potential signal relating to the display function and a touch signal relating to the touch function at different timings (in a time-division manner). The reference potential signal is transferred to all of the touch lines 31 at the same timing, whereby all of the touch electrodes 30 have the reference potential and function as the common electrode 25.

Figure 4:
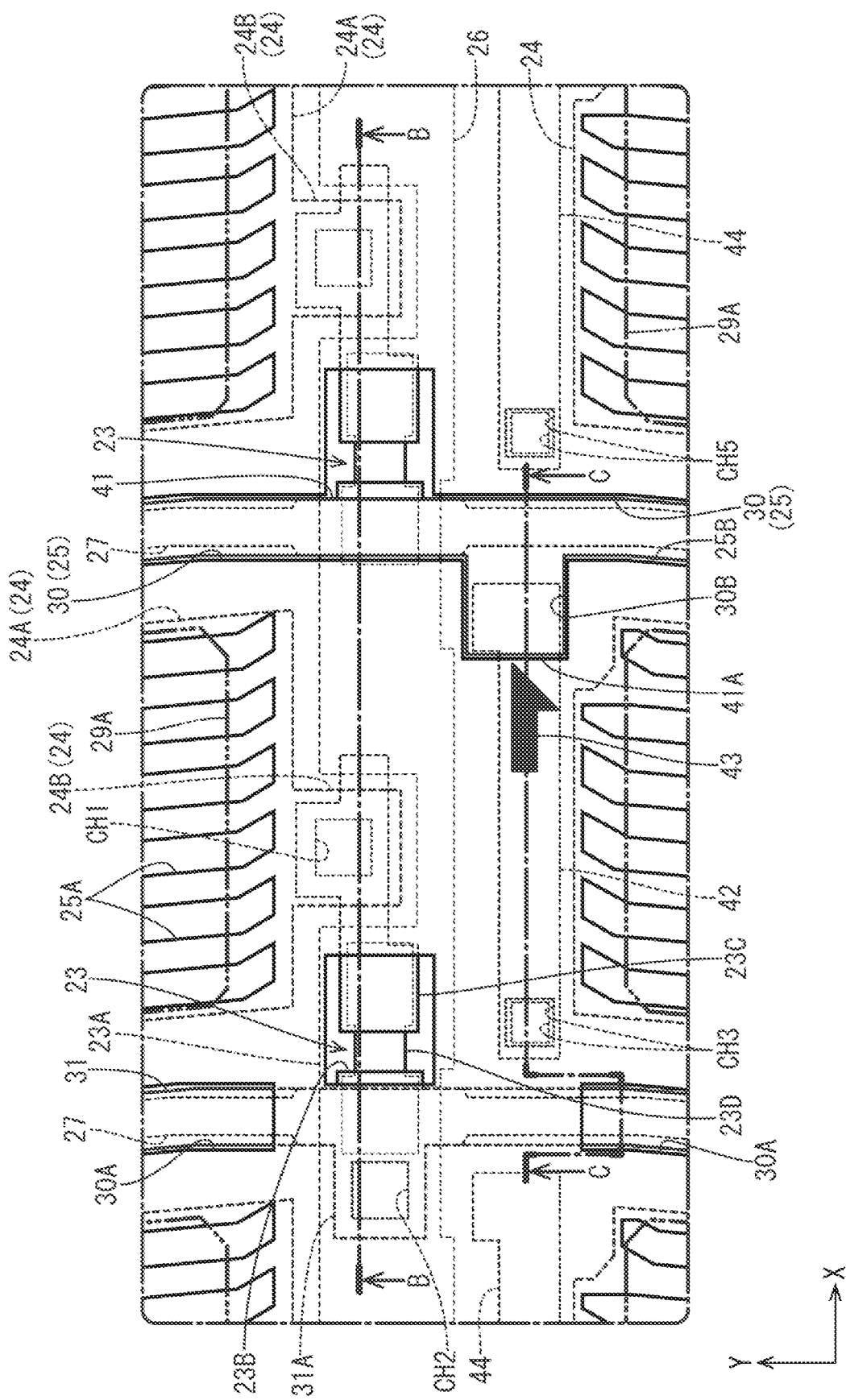
FIG. 4 is a plan view in the vicinity of TFTs and a first connection-enabling portion of an array substrate and a CF substrate of the liquid crystal panel.

The configuration of the TFTs 23 and the pixel electrodes 24 will be described with reference to FIG. 4. FIG. 4 is an enlarged plan view in the vicinity of the TFTs 23 on the array substrate 21. The TFTs 23, as illustrated in FIG. 4, have a horizontally long shape overall, extending in the X-axis direction, and are arranged, on the bottom side in the Y-axis direction in FIG. 4, adjacent to the pixel electrodes 24 being connected therewith. The TFTs 23 include a gate electrode 23A which is apart (overlapping the source lines 27, for example) of the gate lines 26. The gate electrode 23A has a horizontally long shape extending in the X-axis direction, and drives the TFTs 23 based on a scan signal supplied to the gate lines 26, whereby a current between the source electrode 23B and the drain electrode 23C is controlled. The TFTs 23 include a source electrode 23B which is a part (overlapping the gate lines 26) of the source lines 27. The source electrode 23B is disposed on one end side of the TFTs 23 with respect to the X-axis direction. The source electrode 23B has an almost entire area thereof overlapping the gate electrode 23A, and is connected to a channel portion 23D. The TFTs 23 include the drain electrode 23C, which is disposed at a position spaced apart from the source electrode 23B, on the other end side of the TFTs 23 with respect to the X-axis direction. The drain electrode 23C generally extends in the X-axis direction. One end side of the drain electrode 23C is opposed to the source electrode 23B, overlaps the gate electrode 23A, and is connected to the channel portion 23D. The other end side of the drain electrode 23C is connected to the pixel electrodes 24.

The pixel electrodes 24, as illustrated in FIG. 4, include a substantially quadrangular pixel electrode body 24A overlapping the pixel opening 29A of the light shield 29, and a contact portion 24B protruding from the pixel electrode body 24A on the side of the TFT 23 in the Y-axis direction. The contact portion 24B overlaps the other end side of the drain electrode 23C, where the overlapping parts are connected via a pixel contact hole CH1 formed in a first inter-layer insulating film 36. The gate lines 26 have a cutout in an area overlapping both the contact portion 24B and the drain electrode 23C. The cutout is provided to reduce the capacitance between the gate lines 26 and the pixel electrodes 24. The other end of the drain electrode 23C overlaps the gate lines 26. The overlap is provided to prevent variation of the capacitance between the gate lines 26 and the drain electrode 23C (i.e., the pixel electrodes 24) when the position of the drain electrode 23C is displaced with respect to the gate lines 26 during the manufacture of the array substrate 21. The TFTs 23 include a channel portion 23D which overlaps the gate electrode 23A via a gate insulating film 33 to be described later, and is connected to the source electrode 23B and the drain electrode 23C. The channel portion 23D overlaps the gate electrode 23A and extends in the X-axis direction. One end side of the channel portion 23D is connected to the source electrode 23B, and the other end side thereof is connected to the drain electrode 23C. When the TFTs 23 have been placed in on-state based on a scan signal supplied to the gate electrode 23A, an image signal (signal, data signal) supplied to the source lines 27 is supplied from the source electrode 23B to the drain electrode 23C via the channel portion 23D made of a semiconductor film 34. As a result, the pixel electrodes 24 are charged to a potential based on the image signal. The common electrode 25 has a cutout in an area overlapping the channel portion 23D. The cutout is provided to suppress variation in the amount of leak current between the source electrode 23B and the drain electrode 23C due to a potential variation of the common electrode 25 (touch electrodes 30) when the TFTs 23 are in off-state.

Figure 5:
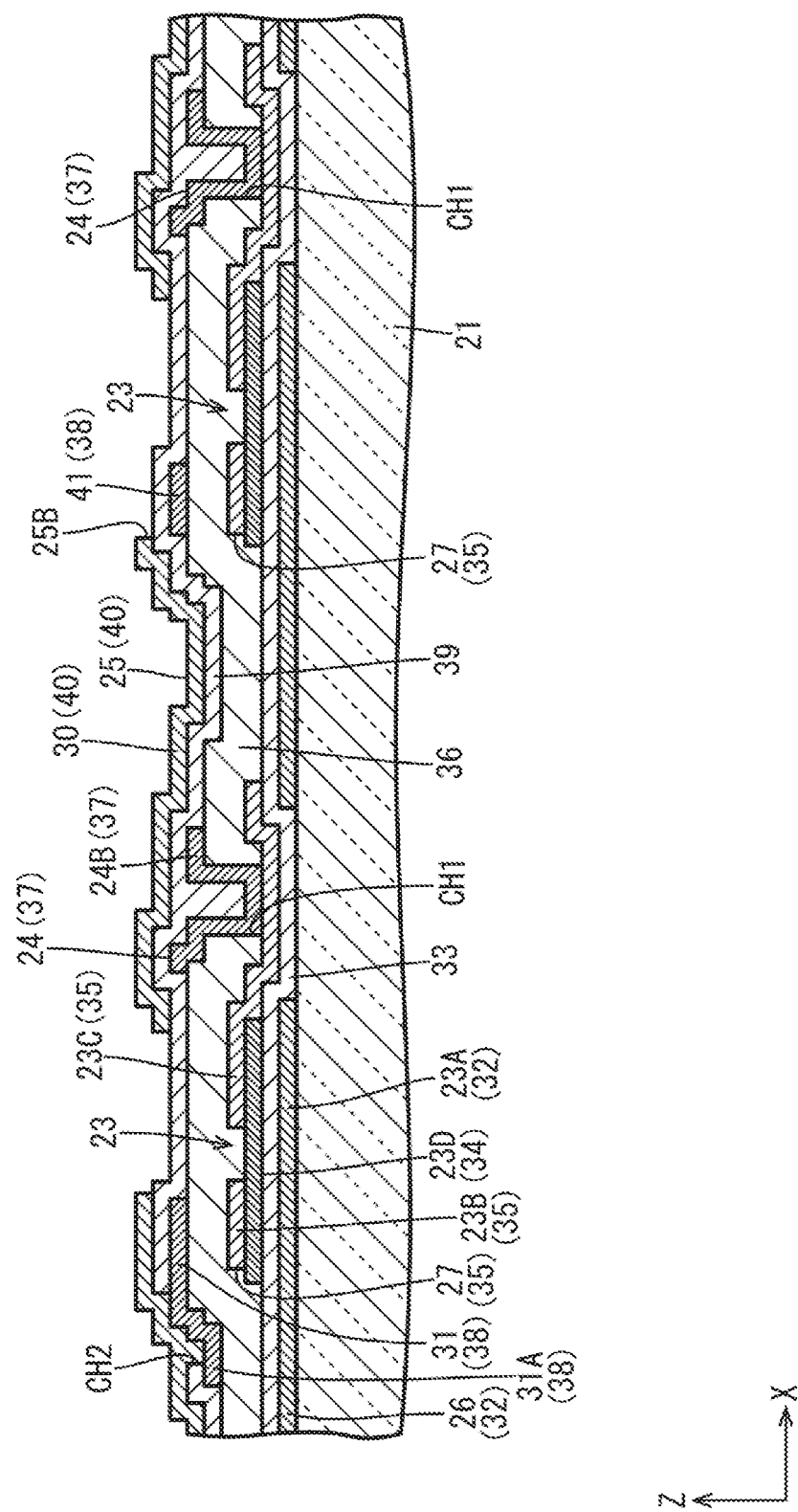
FIG. 5 is a cross section of the array substrate taken along line B-B of FIG. 4.

Various films laminated on the inner surface side of the array substrate 21 will be described with reference to FIG. 5. FIG. 5 is a cross section in the vicinity of the TFTs 23 of the liquid crystal panel 11. On the array substrate 21, as illustrated in FIG. 5, there are laminated, successively from the lower-layer side (glass substrate side): a first metal film 32; the gate insulating film 33; the semiconductor film 34; a second metal film 35; the first inter-layer insulating film 36; a first transparent electrode film 37; a third metal film 38; a second inter-layer insulating film 39; and a second transparent electrode film 40. The first metal film 32, the second metal film 35, and the third metal film 38 are made of either a single-layer film of a metal material selected from copper, titanium, aluminum, molybdenum, tungsten and the like, or a laminate film or an alloy of different metal materials, and thus have electrical conductivity and light-shielding property. The first metal film 32 constitutes the gate lines 26 and the gate electrode 23A of the TFTs 23, for example. The second metal film 35 constitutes the source lines 27 and the source electrode 23B and drain electrode 23C of the TFTs 23, for example. The third metal film 38 constitutes the touch lines 31 and the spare touch line 41, which will be described later, for example. The gate insulating film 33, the first inter-layer insulating film 36, and the second inter-layer insulating film 39 are made of an inorganic material, such as silicon nitride ($SiN_x$) or silicon oxide ($SiO_2$), for example. The gate insulating film 33 keeps the first metal film 32 on lower-layer side and the semiconductor film 34 and the second metal film 35 on the upper-layer side in an insulated state. The first inter-layer insulating film 36 keeps the semiconductor film 34 and the second metal film 35 on the lower-layer side and the first transparent electrode film 37 and the third metal film 38 on the upper-layer side in an insulated state. The second inter-layer insulating film 39 keeps the first transparent electrode film 37 and the third metal film 38 on the lower-layer side and the second transparent electrode film 40 on the upper-layer side in an insulated state. The semiconductor film 34 is made of a thin film of an oxide semiconductor or amorphous silicon material, for example, and constitutes, for example, the channel portion (semiconductor portion) 23D connected to the source electrode 23B and the drain electrode 23C of the TFTs 23. The first transparent electrode film 37 and the second transparent electrode film 40 are made of a transparent electrode material (such as indium tin oxide (ITO) or indium zinc oxide (IZO)). The first transparent electrode film 37 constitutes the pixel electrodes 24 and the like. The first transparent electrode film 37 and the third metal film 38 are disposed on the upper-layer side of the first inter-layer insulating film 36, and are positioned in the same layer. Thus, it may be considered that the pixel electrodes 24 made of the first transparent electrode film 37 and the touch lines 31, the spare touch line 41 and the like made of the third metal film 38 are mutually disposed in the same layer. The second transparent electrode film 40 constitutes the common electrode 25 (touch electrodes 30). In the present embodiment, the touch lines 31 and the spare touch line 41 have a single-layer structure of the third metal film 38. However, the touch lines 31 and the spare touch line 41 may have, for example, a laminate structure of the first transparent electrode film 37 and the third metal film 38.

The configuration of the touch lines 31 in the display region AA will be described with reference mainly to FIG. 5, and, as appropriate, to FIG. 4. The touch lines 31, as illustrated in FIG. 5, are made of the third metal film 38, and, when viewed in plan, are disposed so as to overlap, via the first inter-layer insulating film 36, the source lines 27 made of the second metal film 35. That is, the touch lines 31 are disposed in the same layer as the pixel electrodes 24 made of the first transparent electrode film 37. The touch lines 31 in the display region AA extend generally in the Y-axis direction in parallel with the source lines 27, and are arranged, with respect to the X-axis direction, adjacent to and spaced apart from the pixel electrodes 24 arranged in the Y-axis direction. The touch lines 31 include a pad portion 31A connected to the touch electrodes 30 being connected in the display region AA. The pad portion 31A partly protrudes from a side edge of the touch lines 31 in the X-axis direction, and overlaps the gate lines 26 (see FIG. 4). The overlapping parts of the pad portion 31A and the touch electrodes 30 being connected are connected via a touch line contact hole CH2 formed in the second inter-layer insulating film 39.

The present embodiment is provided with the spare touch line (line, spare position detection line) 41 enabling a repair when a disconnection has occurred in the touch lines 31 configured as described above. The spare touch line 41, as illustrated in FIG. 5, is made of the same third metal film 38 of the touch lines 31, and, when viewed in plan, is disposed so as to overlap the source lines 27 made of the second metal film 35, via the first inter-layer insulating film 36. That is, the spare touch line 41, in addition to the touch lines 31, is disposed in the same layer as the pixel electrodes 24 made of the first transparent electrode film 37. The spare touch line 41 in the display region AA generally extends in the Y-axis direction in parallel with the source lines 27, and is arranged, with respect to the X-axis direction, adjacent to and spaced apart from the pixel electrodes 24 arranged in the Y-axis direction. Thus, the spare touch line 41 and the touch lines 31 sandwich the pixel electrodes 24 with respect to the X-axis direction. The number of the spare touch lines 41 and the touch lines 31 provided will be described with reference to FIG. 6. FIG. 6 is a plan view of a planar arrangement of the touch electrodes 30 and the touch lines 31 in the display region AA of the array substrate 21. First, the number of the source lines 27 that overlap one touch electrode 30 to which the touch lines 31 are connected is the value (66 in the present embodiment) obtained by dividing the dimension (4.1 mm in the present embodiment) of each side of the touch electrode 30, by the arrangement pitch (62 μm in the present embodiment) of the pixel portions PX with respect to the X-axis direction. If the touch lines 31 are arranged so as to overlap all of the source lines 27, when the touch lines 31 are connected one each to the (50 in the present embodiment) touch electrodes 30 arranged in the Y-axis direction and forming a column, excess touch lines 31 are caused. In the present embodiment, as illustrated in FIG. 6, the number of excess touch lines 31 overlapping the touch electrodes 30 is 16, and the number of excess touch lines 31 interposed between the touch electrodes 30 adjacent to each other with respect to the X-axis direction is one. Accordingly, in the present embodiment, the total of 17 excess touch lines 31 with respect to the column of the touch electrodes 30 arranged in the Y-axis direction are used as the spare touch lines 41 available for disconnection repair. That is, the number of the touch lines 31 provided is smaller than the number of the source lines 27 provided, where the difference corresponds to the number of the spare touch lines 41 provided. The number (17) of the spare touch lines 41 provided that can be connected to the touch electrodes 30 arranged in the Y-axis direction and forming a column is smaller than the number (50) of the touch electrodes 30 forming the column. In FIG. 6, the connection portions (touch line contact hole CH2) of the touch electrodes 30 and the touch lines are indicated by dots. In the present embodiment, the arrangement of the spare touch lines 41 interposed between the touch electrodes 30 that are adjacent with respect to the X-axis direction is illustrated as a representative example in FIG. 2 and FIG. 4, for example. However, there are also the spare touch lines 41 overlapping the touch electrodes 30.

Figure 7:
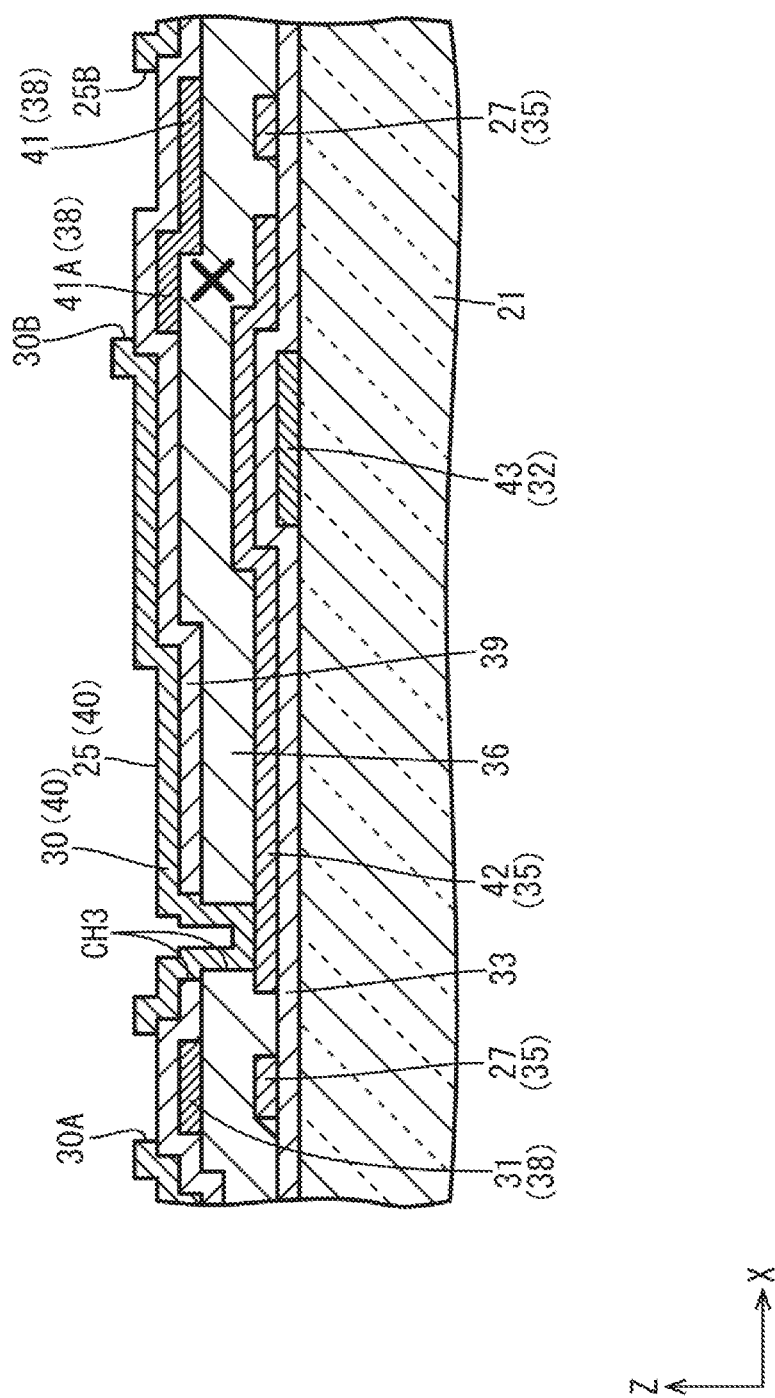
FIG. 7 is a cross section of the array substrate taken along line C-C of FIG. 4.

A configuration for connecting the touch electrodes 30 and the spare touch line 41 in the display region AA of the array substrate 21 will be described with reference to mainly FIG. 7 and, as appropriate, FIG. 4. FIG. 7 illustrates a cross section in the vicinity of a first connection-enabling portion 42 enabling connection of the touch electrodes 30 and the spare touch line 41. The first connection-enabling portion 42, as illustrated in FIG. 7, is made of the same second metal film 35 of the source lines 27, and, when viewed in plan, is disposed so as to overlap, via the first inter-layer insulating film 36 and the second inter-layer insulating film 39, a part of the touch electrode 30 made of the second transparent electrode film 40. The first connection-enabling portion 42 made of the second metal film 35 is disposed so as to overlap, when viewed in plan, a part (one end side) of the spare touch line 41 made of the third metal film 38, via the first inter-layer insulating film 36. Thus, the first inter-layer insulating film 36 is interposed between the first connection-enabling portion 42 and a part of the spare touch line 41, and is also interposed between the source lines 27 and the touch line 31 and spare touch line 41. Thus, the source lines 27 and first connection-enabling portion 42, the touch electrode 30, and the touch line 31 and spare touch line 41 are disposed in mutually different layers. The first connection-enabling portion 42 extends in the X-axis direction, and has one end thereof (the right side in FIG. 7) overlapping a part of the spare touch line 41 and being insulated therefrom by the first inter-layer insulating film 36. The other end (the left side in FIG. 7) of the first connection-enabling portion 42 overlaps a part of the touch electrode 30 and is connected therewith via a first spare touch line contact hole (contact hole) CH3 formed in the first inter-layer insulating film 36 and the second inter-layer insulating film 39.

If a disconnection has occurred in the touch line 31, as illustrated in FIG. 7, laser light is irradiated onto overlapping parts of the first connection-enabling portion 42 connected, via the first spare touchline contact hole CH3, to the touch electrode 30 being connected to the touch line 31 having the disconnection, and the spare touch line 41. As a result, the insulated state due to the first inter-layer insulating film 36 interposed in the overlapping parts between the first connection-enabling portion 42 and the spare touchline 41 is destroyed, and the overlapping parts are short-circuited. In FIG. 7, the portions irradiated with the laser light are indicated by a "cross" sign. In this way, the spare touch line 41 is electrically connected, via the first connection-enabling portion 42, to the touch electrode 30 being connected to the touch line 31 having the disconnection. Thus, the process of laser light irradiation needs to be performed only once. Accordingly, superior workability can be obtained compared to if the first connection-enabling portion were to be insulated with respect to a part of the touch electrode 30 and a part of the spare touch line 41, and if the laser light irradiation process had be performed twice. In addition, the touch electrode 30, rather than the spare touch line 41, is connected to the first connection-enabling portion 42 via the first spare touch line contact hole CH3. Accordingly, the following effects are obtained. That is, if the spare touch line 41, rather than the touch electrode 30, were to be connected to the first connection-enabling portion 42, laser light would be irradiated onto the overlapping parts of the touch electrode 30 and the first connection-enabling portion 42. As a result, the touch electrode 30 itself might be destroyed, and the destroyed pieces might be dispersed into the liquid crystal layer 22, potentially causing a secondary trouble such as short-circuiting other lines or electrodes. In this respect, in the present embodiment, the touch electrode 30 rather than the spare touch line 41 is connected to the first connection-enabling portion 42. Thus, the problem of the touch electrode 30 creating destroyed pieces due to the process of laser light irradiation can be avoided. In this way, the secondary trouble associated with the laser light irradiation process is less liable to occur. In addition, the touch electrode 30 includes the opening 30B formed in a position overlapping the overlapping parts of one end of the first connection-enabling portion 42 and a part of the spare touch line 41. That is, the touch electrode 30 is patterned so as not to overlap the overlapping parts of one end of the first connection-enabling portion 42 and a part of the spare touch line 41. In this way, when the overlapping parts of one end of the first connection-enabling portion 42 and a part of the spare touch line 41 are subjected to the laser light irradiation process, the problem of the touch electrode 30 creating destroyed pieces due to the process can be avoided. Accordingly, the secondary trouble associated with the process of laser light irradiation and the like is even less liable to occur.

The spare touch line 41, as illustrated in FIGS. 4 and 7, includes a protrusion 41A protruding toward the opposite side from the TFT 23 being connected with the source line 27 that the spare touch line 41 overlaps. The protrusion 41A protrudes from the spare touch line 41 laterally in the X-axis direction intersecting the direction in which the spare touch line 41 extends, and is disposed so as to overlap one end of the first connection-enabling portion 42 via the first interlayer insulating film 36. The protrusion 41A, when viewed in plan, has a quadrangular shape, and overlaps one end of the first connection-enabling portion 42 across substantially the entire width thereof. Accordingly, when the first connection-enabling portion 42 and the spare touch line 41 are connected, the overlapping parts of the protrusion 41A of the spare touch line 41 and the first connection-enabling portion 42 are subjected to the laser light irradiation process, thereby short-circuiting the overlapping parts. The protrusion 41A protrudes from the spare touch line 41 toward the opposite side from the TFT 23 being connected with the source line 27. Accordingly, even when the protrusion 41A is subjected to the laser light irradiation process, the process is less liable to affect the TFT 23. In this way, the secondary trouble associated with the laser light irradiation process is less liable to occur.

In a position adjacent to the protrusion 41A of the spare touch line 41, as illustrated in FIGS. 4 and 7, a processing position indicator 43 indicating the position for the laser light irradiation process to an operator is provided. The processing position indicator 43 is disposed on the opposite side of the protrusion 41A from the spare touch line 41 side with respect to the X-axis direction, and is arranged, when viewed in plan, overlapping the first connection-enabling portion 42. The processing position indicator 43 is made of the same first metal film 32 of the gate lines 26 and the gate electrode 23A, and is insulated from the first connection-enabling portion 42 made of the second metal film 35 by the gate insulating film 33 interposed therebetween. That is, the processing position indicator 43 is disposed on the opposite side from the spare touch line 41 side, and, with respect to the Z-axis direction, overlaps the first connection-enabling portion 42 via the gate insulating film 33. The processing position indicator 43 when viewed in plan has an arrow shape disposed with the tip thereof in proximity to the protrusion 41A of the spare touch line 41. In this way, when the overlapping parts of one end of the first connection-enabling portion 42 and the protrusion 41A of the spare touch line 41 are subjected to the laser light irradiation process, it is possible to irradiate laser light onto the overlapping parts accurately based on the processing position indicator 43 disposed adjacent to the overlapping parts. The processing position indicator 43 is arranged so as to overlap the first connection-enabling portion 42 via the gate insulating film 33 on the opposite side from the spare touch line 41 side. Accordingly, the need for a dedicated arrangement space is eliminated, and a decrease in opening ratio is suppressed. In addition, the processing position indicator 43 is made of the first metal film 32 which is the lower-most layer. Accordingly, during laser light irradiation, it is possible to view the processing position indicator 43 easily through the glass substrate of the array substrate 21, providing a high visibility.

The first connection-enabling portion 42, as illustrated in FIG. 4, is disposed so as to be sandwiched, with respect to the Y-axis direction, between the gate line 26 with the TFT 23 overlapping the same and the pixel electrode 24, and, with respect to the X-axis direction, between two source lines 27 sandwiching the pixel electrode 24. In this way, the first connection-enabling portion 42 is prevented from being arranged so as to overlap the pixel electrode 24 and the gate line 26, while avoiding the problem of a short-circuit between the first connection-enabling portion 42 and the source lines 27 in the same layer. The first connection-enabling portion 42 thus configured is provided adjacent to the spare touch line 41 selectively. Meanwhile, at positions adjacent to the touch lines 31, as illustrated in FIG. 2, dummy first connection-enabling portions 44 made of the same second metal film 35 of the first connection-enabling portion 42 are provided. The dummy first connection-enabling portions 44 have a planar arrangement such that, as viewed in plan, the positional relationship with respect to the pixel electrodes 24, the gate lines 26, and the source lines 27 is substantially the same as the positional relationship relating to the first connection-enabling portion 42. The dummy first connection-enabling portions 44, similarly to the first connection-enabling portion 42, are connected to the touch electrodes 30 via a dummy spare touch line contact hole CH5. The dummy first connection-enabling portions 44, however, are not connected to the touch lines 31. In this way, the parasitic capacity relating to the pixel electrodes 24 adjacent to the dummy first connection-enabling portions 44, and the parasitic capacity relating to the pixel electrodes 24 adjacent to the first connection-enabling portion 42 are made uniform. Accordingly, a decrease in display quality can be suppressed in a more preferable manner.

Figure 8:
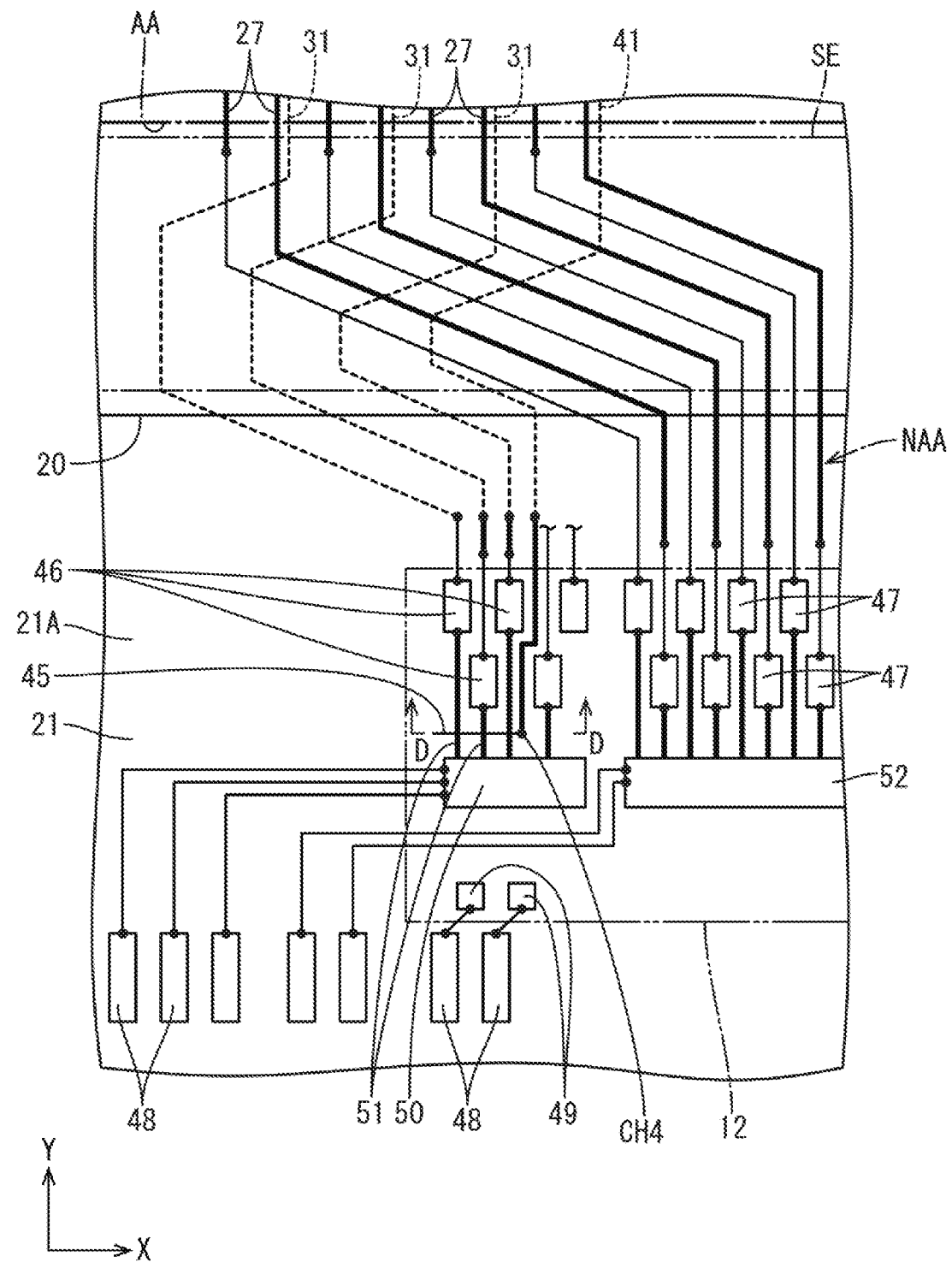
FIG. 8 is a plan view in the vicinity of a driver mounting region of the liquid crystal panel.
Figure 9:
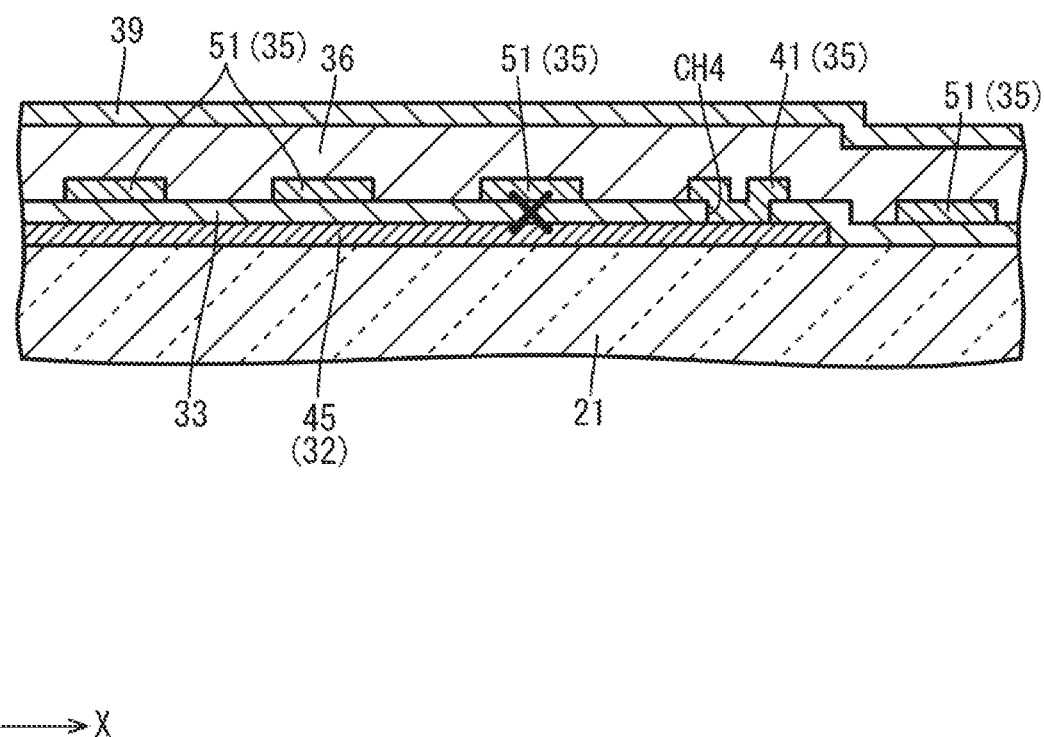
FIG. 9 is a cross section of the array substrate taken along line D-D of FIG. 8.

A configuration for connecting the touch lines 31 and the spare touch line 41 in the non-display region NAA of the array substrate 21 will be described with reference to mainly FIGS. 8 and 9. FIG. 8 is a plan view in the vicinity of a mounting region for the drivers 12 in the array substrate 21. FIG. 9 illustrates a cross section of a second connection-enabling portion 45 for connecting the touch lines 31 and the spare touch line 41. The touch lines 31 and the spare touch line 41, as illustrated in FIG. 8, include lead-out portions (the other end side) that are led out of the display region AA and disposed in the non-display region NAA. The lead-out portions can be connected by the second connection-enabling portion 45. In FIG. 8, a seal portion SE for sealing the liquid crystal layer 22 (see FIG. 3) sandwiched between the pair of substrates 20, 21, and the driver 12 are indicated by dashed and double-dotted lines. Before describing the second connection-enabling portion 45, the configuration of the touch lines 31 and the spare touch line 41 being connected by the second connection-enabling portion 45 in the non-display region NAA will be described. The portions of the touch lines 31 and the spare touch line 41 that are led out of the display region AA and across the seal portion SE to the vicinity of the mounting region for the drivers 12 in the CF substrate non-overlapping portion 21A are made of the third metal film 38. Further extending portions of the touch lines 31 and the spare touch line 41 which are disposed in the vicinity of touch line terminal portions (signal input portion) 46, which will be described below, are layer-changed to the first metal film 32 or the second metal film 35 via contact holes. In FIG. 8, the first metal film 32 is indicated by thin solid lines; the second metal film 35 by thick solid lines; and the third metal film 38 by dashed lines. The ends of the lead-out portions of the touch lines 31 being led out of the display region AA are connected to the touch line terminal portions 46 disposed in the mounting region for the drivers 12. The mounting region for the drivers 12 includes: source line terminal portions 47 to which the ends of lead-out portions of the source lines 27 led out of the display region AA are connected; and flexible substrate connection terminal portions 49 connected to flexible substrate terminal portions 48 disposed in a mounting region for the flexible substrate 13. The touch line terminal portions 46 are arranged in a zigzag manner when viewed in plan. A touch testing circuit part (testing circuit part) 50 is provided at a position on the opposite side of the touch line terminal portions 46 from the display region AA side (touch electrode 30 side) with respect to the Y-axis direction. The touch testing circuit part 50 is provided to examine the presence or absence of a defect, such as disconnection, in the touch lines 31 and the spare touch line 41 utilized for a disconnection repair. The touch lines 31 include extensions 51 extending from the touch line terminal portions 46 to the touch testing circuit part 50 and connected thereto. The lead-out portion of the spare touch line 41 from the display region AA is parallel with the lead-out portions (including the extensions 51) of the touch lines 31, and has an end extending to the vicinity of the touch testing circuit part 50. The extensions 51 and the lead-out portion of the spare touch line 41 are both made of the second metal film 35. A source testing circuit part (signal line testing circuit part) 52 for examining the presence or absence of a defect, such as a disconnection, relating to the source lines 27 is provided in a position on the opposite side of the source line terminal portions 47 from the display region AA side with respect to the Y-axis direction. The source line terminal portions 47 are connected to the source testing circuit part 52.

The second connection-enabling portion 45, as illustrated in FIGS. 8 and 9, is disposed between the touch line terminal portions 46 and the touch testing circuit part 50 with respect to the Y-axis direction, and is disposed so as to overlap the extensions 51 of the touch lines 31 and the lead-out portion of the spare touch line 41. The second connection-enabling portion 45 is made of the first metal film 32, and the gate insulating film 33 is interposed between the extensions 51 of the touch lines 31 and the lead-out portion of the spare touch line 41 overlapping each other. The second connection-enabling portion 45 is connected to the lead-out portion of the spare touch line 41 through a second spare touchline contact hole (contact hole) CH4 formed in the gate insulating film 33. On the other hand, the second connection-enabling portion 45 is insulated by the gate insulating film 33 with respect to the extensions 51 of the touch lines 31. Thus, when a disconnection has occurred in the touch lines 31, laser light is irradiated onto the overlapping parts of the extension 51 of the touch line 31 in which the disconnection has occurred and the second connection-enabling portion 45. As a result, the insulated state due to the gate insulating film 33 interposed in the overlapping parts of the extension 51 of the touch line 31 and the second connection-enabling portion 45 is destroyed, and the overlapping parts are short-circuited. In FIG. 9, the portions irradiated with laser light is indicated by a "cross" sign. The second connection-enabling portion 45 is connected to the lead-out portion of the spare touch line 41 through the second spare touch line contact hole CH4 in advance. In this way, the spare touch line 41 is electrically connected via the second connection-enabling portion 45 to the touch line 31 having a disconnection. Thus, the laser light irradiation process needs to be performed only once. Accordingly, compared to the second connection-enabling portion were insulated with respect to both the extensions 51 of the touch lines 31 and the lead-out portion of the spare touch line 41 and the laser light irradiation process had to be performed twice, superior workability can be obtained. In addition, the spare touch line 41 is connected to the second connection-enabling portion 45 through the second spare touchline contact hole CH4, and the touch lines 31 are normally (a state in which no disconnection repair is performed) insulated from the second connection-enabling portion 45. Accordingly, the capacitance produced between a certain touch line 31 and another touch line 31 can be maintained small.

As described above, when a disconnection has occurred in the touch line 31 in the display region AA, as illustrated in FIG. 7, the touch electrode 30 being connected to the touch line 31 having the disconnection and the protrusion 41A of the spare touch line 41 are connected by the first connection-enabling portion 42. On the other hand, as illustrated in FIG. 9, in the non-display region NAA, the extension 51 of the touchline 31 having the disconnection and the lead-out portion of the spare touch line 41 are connected by the second connection-enabling portion 45. Thus, a touch signal input to the touch line terminal portion 46 and a common signal for placing the touch electrode 30 at the reference potential are transferred from the extension 51 of the touch line 31 to the lead-out portion of the spare touch line 41 via the second connection-enabling portion 45, and from the protrusion 41A of the spare touch line 41 to the touch electrode 30 via the first connection-enabling portion 42.

As described above, the liquid crystal panel (position input device) 11 according to the present embodiment is provided with: the touch electrode (position detecting electrode) 30 which forms a capacitance between the touch electrode and a position input body configured to make a position input, and which detects an input position due to the position input body; the touch lines (position detection line) 31 of which one end side is connected to the touch electrodes 30; the spare touch line (line) 41 parallel with the touch lines 31; the first connection-enabling portion 42 which is disposed so as to overlap a part of the touch electrodes 30 and one end side of the spare touch line 41, and which is insulated by at least one (insulating film) of the first inter-layer insulating film 36 and second inter-layer insulating film 39 with respect to at least one of a part of the touch electrodes 30 and one end side of the spare touch line 41; the touch line terminal portions (signal input portion) 46 connected to the other end side of the touch lines 31; and the second connection-enabling portion 45 which is disposed so as to overlap the other end side of the touchlines 31 and the other end side of the spare touch line 41, and which is insulated by the gate insulating film (insulating film) 33 with respect to at least one of the other end side of the touch lines 31 and the other end side of the spare touch line 41.

Thus, the touch lines 31 has one end side thereof connected to the touch electrodes 30 and the other end side thereof connected to the touch line terminal portions 46. Accordingly, a signal input from the touch line terminal portions 46 can be supplied to the touch electrodes 30. The touch electrodes 30, by forming a capacitance between the touch electrodes 30 and a position input body for making a position input, can detect an input position due to the position input body. When a disconnection has occurred in the touch lines 31, a repair can be performed using the spare touch line 41 parallel with the touch lines 31. The spare touch line 41 has one end side thereof overlapping the first connection-enabling portion 42, and the other end side thereof overlapping the second connection-enabling portion 45. The first connection-enabling portion 42 overlapping one end side of the spare touch line 41 also overlaps a part of the touch electrodes 30, and is insulated by at least one of the first inter-layer insulating film 36 and the second inter-layer insulating film 39 with respect to at least one of a part of the touch electrodes 30 and one end side of the spare touch line 41. Accordingly, by subjecting the portion insulated by at least one of the first inter-layer insulating film 36 and the second inter-layer insulating film 39 to a process such as laser light irradiation, the touch electrodes 30 and the spare touch line 41 can be electrically connected by the first connection-enabling portion 42. The second connection-enabling portion 45 overlapping the other end side of the spare touch line 41 also overlaps the other end side of the touch lines 31, and is insulated by the gate insulating film 33 with respect to at least one of the other end side of the touch lines 31 and the other end side of the spare touch line 41. Accordingly, by subjecting the portion insulated by the gate insulating film 33 to a process such as laser light irradiation, the touch lines 31 and the spare touch line 41 can be electrically connected by the second connection-enabling portion 45. In this way, a signal input to the signal touch line terminal portions 46 is transferred from the other end side of the touch lines 31 to the other end side of the spare touch line 41 via the second connection-enabling portion 45, and then supplied from one end side of the spare touch line 41 to the touch electrodes 30 via the first connection-enabling portion 42.

When, as in the past, one end side of the spare touch line 41 is connected to an electric element other than the touch electrodes 30, it is necessary to perform a process of electrically separating one end side of the spare touch line 41 from the electric element, and then perform a process of connecting the one end side of the spare touch line 41 to the touch electrodes 30. These processes are performed in close proximity, increasing the probability of causing a secondary trouble associated with the processes. In this respect, according to the above-described configuration, a process is performed separately for one end side of the spare touch line 41 and the other end side, so that the portions subjected to the processes are dispersed. Accordingly, the probability of causing a secondary trouble associated with the processes can be reduced. In addition, compared to a case in which one end side of the spare touch line 41 were connected to a part of the touch electrodes 30 in advance and the other end side were connected to the touch line terminal portions 46 in advance, and in which redundancy is achieved by supplying the touch electrodes 30 with the same signal of the touch lines 31, there is no need to connect the other end side of the spare touch line 41 to the touch line terminal portions 46. Accordingly, an arrangement space in the vicinity of the touchline terminal portions 46 is reduced, and a decrease in frame width and an increase in resolution can be achieved in a preferable manner.

The first connection-enabling portion 42 is connected to a part of the touch electrodes 30 through the first spare touch line contact hole (contact hole) CH3 formed in the first inter-layer insulating film 36 and the second inter-layer insulating film 39. The first connection-enabling portion 42, however, is insulated by the first inter-layer insulating film 36 with respect to one end side of the spare touch line 41. In this way, compared to a case in which the first connection-enabling portion 42 were insulated with respect to both a part of the touch electrodes 30 and one end side of the spare touch line 41 via at least one of the first inter-layer insulating film 36 and the second inter-layer insulating film 39, the number of times that a process such as laser light irradiation is performed is reduced. In this way, superior workability can be obtained. In addition, the touch electrodes 30, rather than the spare touch line 41, are connected to the first connection-enabling portion 42 through the first spare touch line contact hole CH3. Accordingly, a process such as laser light irradiation is less liable to affect the touch electrodes 30. In this way, a secondary trouble associated with a process such as laser light irradiation is less liable to occur.

The touch electrodes 30 are disposed in a different layer from that of the touch lines 31 and the spare touch line 41 so that at least one of the first inter-layer insulating film 36 and the second inter-layer insulating film 39 is interposed between the touch electrodes 30 and each of the touch lines 31 and the spare touch line 41, and the opening 30B is formed in a position overlapping the overlapping parts of the first connection-enabling portion 42 and one end side of the spare touch line 41. In this way, even when the overlapping parts of the first connection-enabling portion 42 and one end side of the spare touch line 41 are subjected to a process such as laser light irradiation, the process is less liable to affect the touch electrodes 30. Accordingly, a secondary trouble associated with a process such as laser light irradiation is even less liable to occur.

The second connection-enabling portion 45 is connected to the other end side of the spare touch line 41 through the second spare touch line contact hole (contact hole) CH4 formed in the gate insulating film 33. The second connection-enabling portion 45, however, is insulated with respect to the other end side of the touch lines 31 by the gate insulating film 33. In this way, compared to a case in which the second connection-enabling portion 45 were insulated with respect to both the other end side of the touch lines 31 and the other end side of the spare touch line 41 via the gate insulating film 33, the number of times that a process such as laser light irradiation is performed is reduced. Accordingly, superior workability can be obtained. In addition, the spare touch line 41 is connected to the second connection-enabling portion 45 through the second spare touch line contact hole CH4, and the touch lines 31 are normally insulated from the second connection-enabling portion 45. Thus, the capacitance produced between a certain touch line 31 and another touch line 31 can be maintained small.

The liquid crystal panel 11 is also provided with the pixel electrodes 24 and the common electrode 25 disposed so as to at least partly overlap the pixel electrodes 24 via the second inter-layer insulating film (insulating film) 39. The touch electrodes 30 are made of divided parts of the common electrode 25, and the touch line terminal portions 46 input, to the touch electrodes 30 via the touch lines 31, a position detection signal and a common signal for placing the touch electrodes 30 at a reference potential in a time-division manner. The touch lines 31 and the spare touch line 41 are disposed so as to sandwich the pixel electrodes 24. In this way, the touch electrodes 30, which are divided parts of the common electrode 25, are placed at the reference potential when supplied with the common signal from the touch line terminal portions 46 via the touch lines 31. Thus, a potential difference based on the voltage of the pixel electrodes 24 can be produced between the touch electrodes 30 and the pixel electrodes 24 that the touch electrodes 30 overlap via the second inter-layer insulating film 39. The potential difference can be utilized to display an image. Meanwhile, the touch electrodes 30, when supplied with the position detection signal from the touch line terminal portions 46 via the touch lines 31, enable detection of an input position due to a position input body. Thus, the position detection function and the image display function can be implemented. The touch lines 31 and the spare touch line 41 are disposed so as to sandwich the pixel electrodes 24, making it possible to adopt a mutually parallel and extending arrangement in a preferable manner.

The liquid crystal panel 11 is also provided with the source lines (signal line) 27 which supply the pixel electrodes 24 with a signal and are disposed so as to sandwich the pixel electrodes 24. The touch lines 31 and the spare touch line 41 are disposed mutually in the same layer so as to overlap the source lines 27 via the first inter-layer insulating film (insulating film) 36. In this way, compared to a case in which the source lines 27 and the touch lines 31 and the spare touch line 41 were arranged in the same layer, the arrangement spaces for the source lines 27, the touch lines 31, and the spare touch line 41 can be reduced. Accordingly, the opening ratio can be increased, and an increase in resolution can be achieved in a preferable manner.

The first connection-enabling portion 42 is disposed the same layer as the source lines 27. In this way, the first inter-layer insulating film 36 interposed between the first connection-enabling portion 42 and one end side of the spare touch line 41 becomes the same as the first inter-layer insulating film 36 interposed between the source lines 27 and the touch lines 31 and spare touch line 41. Compared to a case in which the first connection-enabling portion 42 were disposed in a separate layer from that of the source lines 27, a decrease in manufacturing cost can be achieved in a preferable manner.

The liquid crystal panel 11 is also provided with the processing position indicator 43 which is disposed adjacent to the overlapping parts of the first connection-enabling portion 42 and at least one of a part of the touch electrodes 30 and one end side of the spare touchline 41 overlapping via at least one of the first inter-layer insulating film 36 and the second inter-layer insulating film 39, and which is arranged overlapping the first connection-enabling portion 42 via the gate insulating film (insulating film) 33 on the opposite side from the spare touchline side. Thus, when the overlapping parts of the first connection-enabling portion 42 and at least one of a part of the touch electrodes 30 and one end side of the spare touch line 41 is subjected to a process such as laser light irradiation, it is possible to perform the process accurately with respect to the overlapping parts based on the processing position indicator 43 disposed adjacent to the overlapping parts. The processing position indicator 43 is arranged overlapping the first connection-enabling portion 42 via the gate insulating film 33 on the opposite side from the spare touch line 41 side. Accordingly, the need for a dedicated arrangement space is eliminated, and a decrease in opening ratio is suppressed. In addition, superior visibility can be obtained during the process.

The liquid crystal panel 11 is also provided with the TFTs (switching element) 23 connected to the pixel electrodes 24 and the source lines 27, and the gate lines (scan lines) 26 for supplying a scan signal for driving the TFTs 23. The pixel electrodes 24 are disposed side by side so as to sandwich the gate lines 26. The first connection-enabling portion 42 is sandwiched between the gate lines 26 and the pixel electrodes 24, and is disposed so as to be sandwiched between the two source lines 27 sandwiching the pixel electrodes 24. In this way, when the TFTs 23 are driven based on a scan signal supplied from the gate lines 26, the pixel electrodes 24 are charged to a potential based on a signal supplied from the source lines 27. The first connection-enabling portion 42 disposed in the same layer as the source lines 27 is sandwiched between the gate lines 26 and the pixel electrodes 24, and is disposed so as to be sandwiched between the two source lines 27 sandwiching the pixel electrodes 24. Thus, the first connection-enabling portion 42 is prevented from being arranged overlapping the pixel electrodes 24 and the gate lines 26 and from being short-circuited with the source lines 27.

The TFTs 23 are disposed unevenly so as to be adjacent to one side with respect to the source lines 27 being connected. The spare touch line 41 include the protrusion 41A which protrudes toward the opposite side from the side of the TFT 23 being connected to the source lines 27 that the spare touch line 41 overlaps and overlaps the first connection-enabling portion 42, and which is insulated from the first connection-enabling portion 42 by the first inter-layer insulating film (insulating film) 36. In this way, when the first connection-enabling portion 42 and the spare touch line 41 are connected, the overlapping parts of the protrusion 41A of the spare touch line 41 and the first connection-enabling portion 42 are subjected to a process such as laser light irradiation to short-circuit the overlapping parts. The protrusion 41A protrudes from the spare touch line 41 toward the opposite side from the side of the TFT 23 being connected to the source lines 27. Accordingly, even when the protrusion 41A is subjected to a process such as laser light irradiation, the process is less liable to affect the TFTs 23. Accordingly, a secondary trouble associated with a process such as laser light irradiation is less liable to occur.

The liquid crystal panel 11 is also provided with the touch testing circuit part 50 which is disposed on the opposite side from the touch electrode 30 side with respect to the touch line terminal portions 46. The touch lines 31 include on the other end side thereof the extensions 51 extending from the touch line terminal portions 46 on the side of the touch testing circuit part 50 and connected to the touch testing circuit part 50. The spare touch line 41 has the other end side thereof being disposed on the side of the touch testing circuit part 50 with respect to the touch line terminal portions 46. The second connection-enabling portion 45 is disposed between the touch line terminal portions 46 and the touch testing circuit part 50 and is disposed so as to overlap the extensions 51 and the other end side of the spare touch line 41. In this way, it can be tested, using the touch testing circuit part 50, whether a defect, such as a disconnection, is present in the touch lines 31. The touch testing circuit part 50 is disposed on the opposite side from the touch electrode 30 side with respect to the touch line terminal portions 46. Accordingly, a decrease in frame width is less liable to be made difficult by the arrangement space for the touch testing circuit part 50. The second connection-enabling portion 45 is disposed between the touch testing circuit part 50 and the touch line terminal portions 46, the touch testing circuit part 50 being disposed on the opposite side from the touch electrode 30 side with respect to the touch line terminal portions 46. The second connection-enabling portion 45 makes it possible to connect the extensions 51 of the touch lines 31 extending from the touch line terminal portions 46 on the side of the touch testing circuit part 50, and the other end side of the spare touch line 41 disposed on the side of the touch testing circuit part 50 with respect to the touch line terminal portions 46.

Second Embodiment

A second embodiment will be described with reference to FIG. 10 or FIG. 11. In the second embodiment, a modification of the configuration and the like of a spare touch line 141 will be described. Redundant descriptions of the structures, operations, and effects similar to those of the first embodiment will be omitted.

Figure 10:
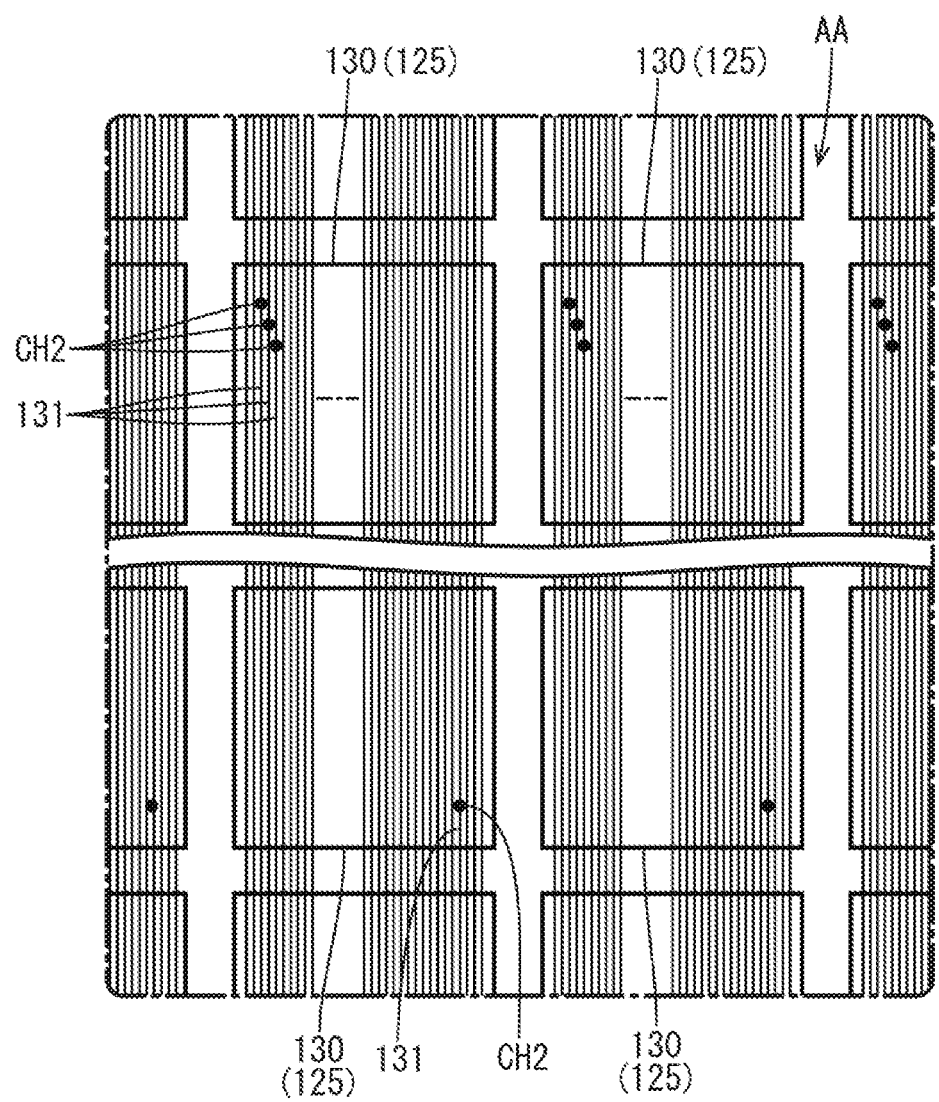
FIG. 10 is a plan view of the touch electrodes, touch lines, and spare touch lines of a liquid crystal panel according to a second embodiment.

Touch electrodes 130 of the present embodiment, as illustrated in FIG. 10, include those to which touch lines 131 are connected. Specifically, the touch electrodes 130 arranged in the Y-axis direction and forming a column include those of which the distance from a driver is relatively short and to which a relatively small number of the touch lines 131 are connected, and those of which the distance from the driver is relatively long and to which a relatively number of the touch lines 131 are connected. In FIG. 10, three touch lines 131 are connected to the touch electrodes 130 having a longer distance from the driver. The touch electrodes 130 having a longer distance from the driver, compared to the touch electrodes 130 having a shorter distance from the driver, have a greater line length of the touch lines 131. Accordingly, a touch signal that is transferred to the touch electrodes 130 may become blunted. In this respect, as described above, when a relatively large number of touch lines 131 are connected to the touch electrodes 130 having a longer distance from the driver, the touch signal transferred to the touch electrodes 130 is less liable to become blunted, and the touch sensitivity is improved. In the present embodiment, the difference between the number of the touch lines 131 provided and the number of the source lines 127 provided is smaller than that in the first embodiment. Consequently, the number of the spare touch lines 141 provided is smaller than that in the first embodiment.

Figure 11:
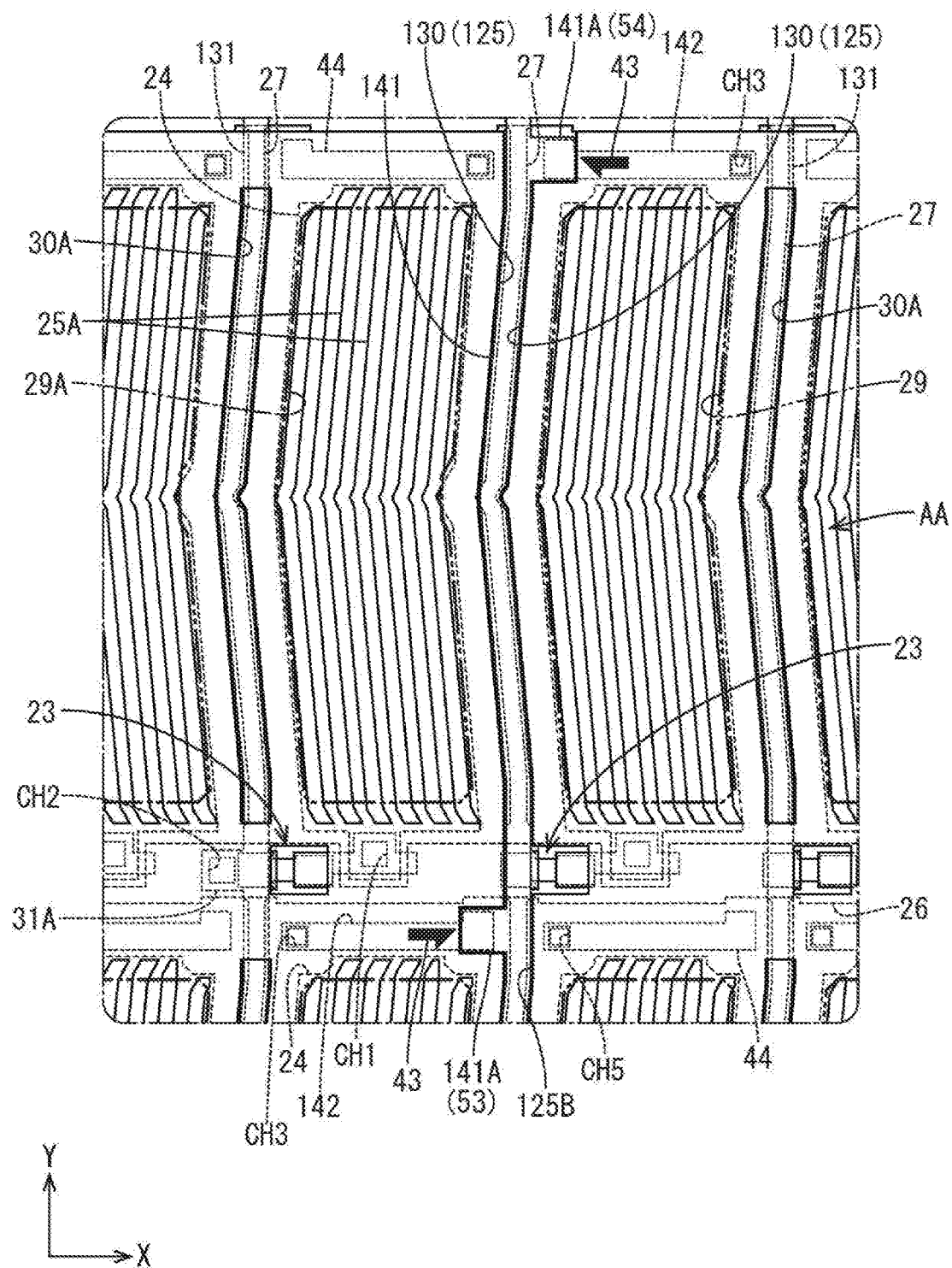
FIG. 11 is a plan view of a pixel arrangement of the liquid crystal panel.

Meanwhile, the spare touch line 141 disposed between the two columns of touch electrodes 130 adjacent to each other with respect to the X-axis direction, as illustrated in FIG. 11, can be connected to either of the adjacent touch electrodes 130, via first connection-enabling portions 142. Specifically, the spare touch line 141 in the above-described arrangement has protrusions 141A including a first protrusion (first overlapping portion) 53 protruding toward one side (such as the left side in FIG. 11) with respect to the X-axis direction, and a second protrusion (second overlapping portion) 54 protruding toward the other side (such as the right side in FIG. 11) with respect to the X-axis direction. The first protrusion 53 overlaps the first connection-enabling portion 142 being connected to the touch electrode 130 adjacent to the spare touch line 141 on one side with respect to the X-axis direction. The second protrusion 54 overlaps the first connection-enabling portion 142 being connected to the touch electrode 130 adjacent to the spare touch line 141 on the other side with respect to the X-axis direction. The spare touch line 141 having the first protrusion 53 and the second protrusion 54 is arranged overlapping partitioning openings 125B of a common electrode 125. According to the configuration, it is possible to perform a disconnection repair using a single spare touch line 141 when a disconnection has occurred in either of the touch lines 131 respectively connected to the two columns of touch electrodes 130 sandwiching the spare touch line 141. That is, when a disconnection has occurred in either of the touch lines 131, it becomes possible to supply a touch signal to the touch electrode 130 being connected to the touch line 131 having the disconnection, by connecting the first protrusion 53 or the second protrusion 54 of the spare touch line 141 with one first connection-enabling portion 142 or the other first connection-enabling portion 142 adjacent to the spare touch line 141. Thus, there is no need to provide the spare touch line 141 separately with respect to each of the columns of the touch electrodes 130. This is particularly preferable when the number of the spare touch lines 141 provided is smaller, as in the present embodiment, than in the first embodiment.

As described above, according to the present embodiment, the touch electrodes 130 and the first connection-enabling portions 142 are disposed side by side so as to sandwich the spare touch line 141. The spare touch line 141 includes the first protrusion (first overlapping portion) 53 with one end side thereof overlapping one adjacent first connection-enabling portion 142, and the second protrusion (second overlapping portion) 54 with one end side thereof overlapping the other adjacent first connection-enabling portion 142. In this way, when a disconnection has occurred in either of the touch lines 131 respectively connected to the two touch electrodes 130 sandwiching the spare touch line 141, it becomes possible to supply a signal to the touch electrode 130 being connected to the touch line 131 having the disconnection, by connecting the first protrusion 53 or the second protrusion 54 on one end side of the spare touch line 141 to one first connection-enabling portion 142 or the other first connection-enabling portion 142 adjacent to the spare touch line 141. Thus, there is no need to provide the spare touch line 141 separately with respect to each of the columns of the touch electrodes 130. Accordingly, the number of the spare touch lines 141 provided can be reduced in a preferable manner.

Third Embodiment

A third embodiment will be described with reference to FIG. 12 or 13. In the third embodiment, a modification of the arrangement and the like of a second connection-enabling portion 245 and a touch testing circuit part 250 from the first embodiment will be described. Redundant descriptions of the structures, operations, and effects similar to those of the first embodiment will be omitted.

Figure 12:
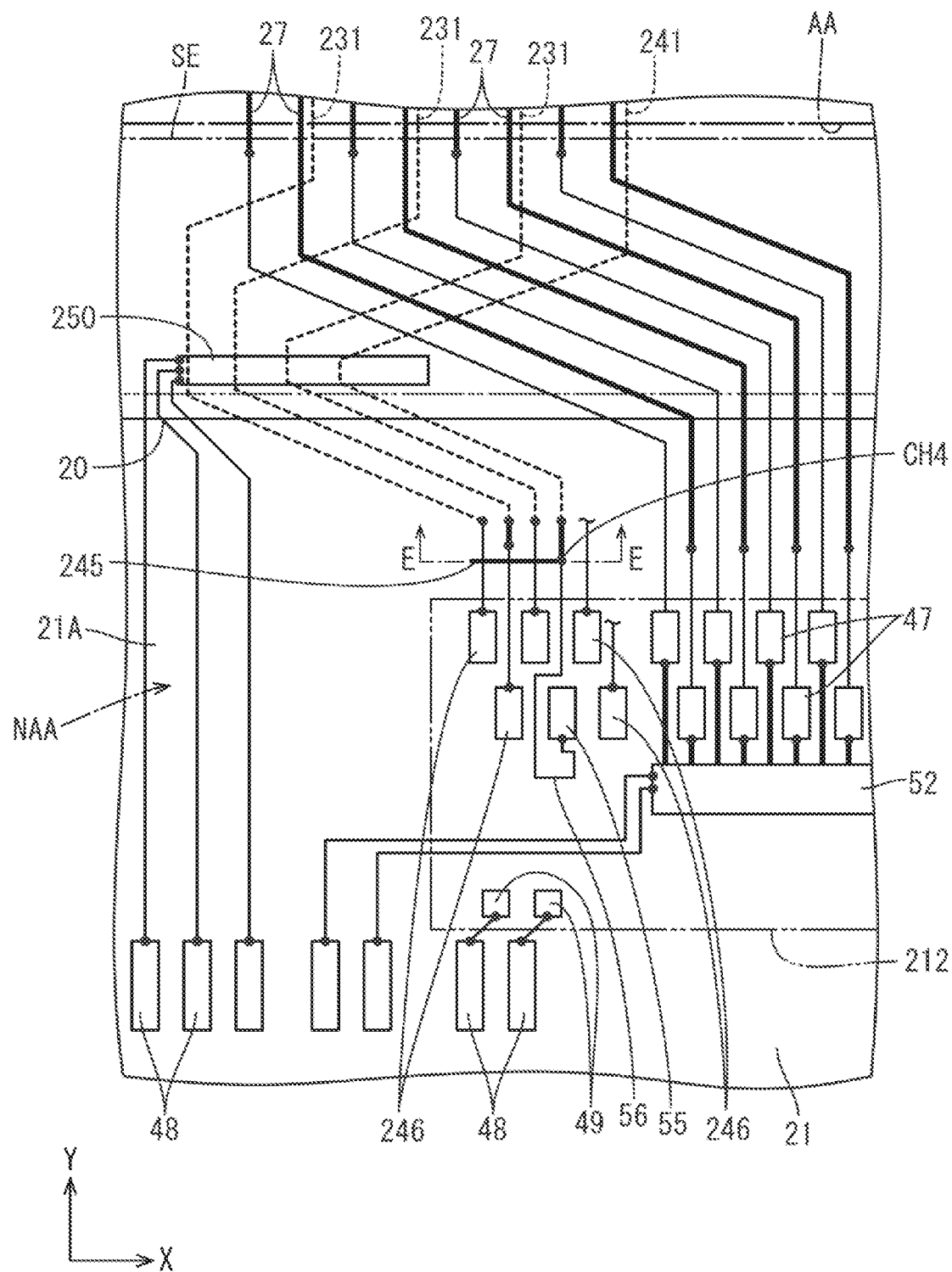
FIG. 12 is a plan view in the vicinity of a driver mounting region of a liquid crystal panel according to a third embodiment.
Figure 13:
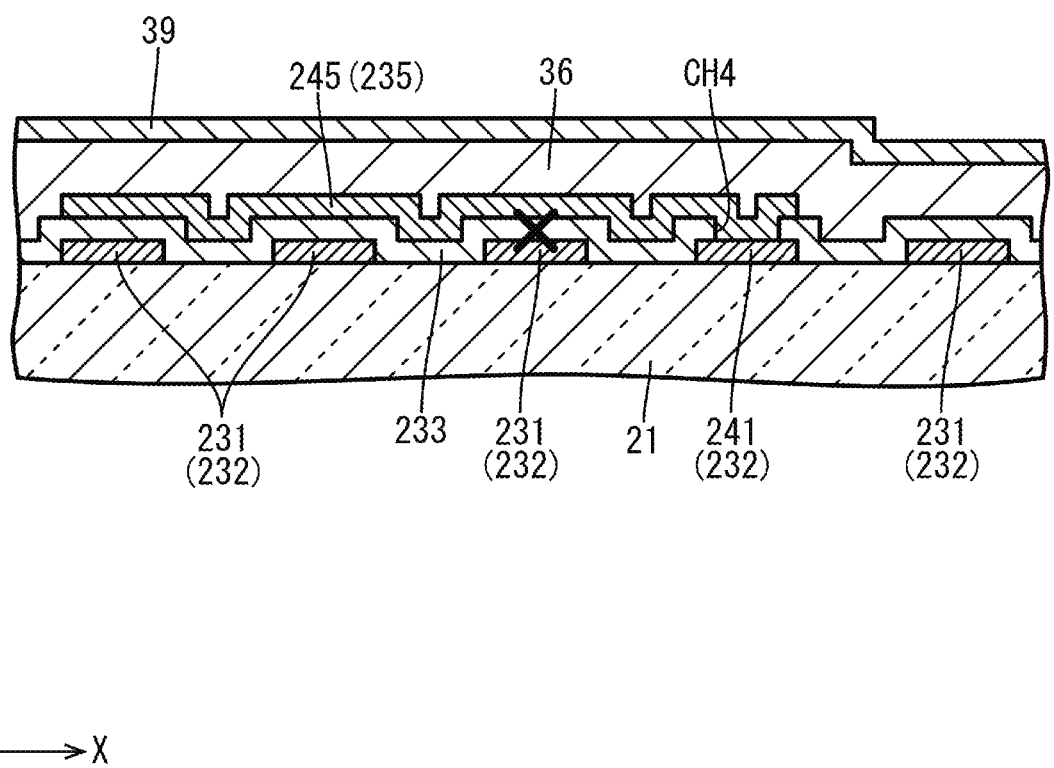
FIG. 13 is a cross section of the array substrate taken along line E-E of FIG. 12.

The touch testing circuit part 250 according to the present embodiment, as illustrated in FIG. 12, is disposed on the display region AA (touch electrode) side of a touch line terminal portions 246 with respect to the Y-axis direction. Specifically, the touch testing circuit part 250 is disposed in a position overlapping the seal portion SE, where the freedom of arrangement is greater compared to the configuration described with reference to the first embodiment. Touch lines 231 and a spare touch line 241 are routed such that the lead-out portions (the other end side) thereof extend from the display region AA toward the touch line terminal portions 246 via the touch testing circuit part 250. Accordingly, it can be tested, using the touch testing circuit part 250, whether a defect, such as a disconnection, is present in the touch lines 231 or the spare touch line 241 that has been utilized for a disconnection repair. The touch lines 231 do not have the extensions 51 (see FIG. 8) as described with reference to the first embodiment. In the vicinity of the touch line terminal portions 246 in the mounting region for the driver 212, a spare touch line terminal portion (second signal input portion) 55 to which the lead-out portion of the spare touch line 241 is connected is provided. The spare touch line terminal portion 55 and the touch line terminal portions 246 are disposed side by side in a zigzag manner. The spare touch line terminal portion 55 is made of a first metal film 232 as is the touch line terminal portions 246, and is configured to supply (input) a common signal output from a driver 212 to the spare touchline 241. As described with reference to the first embodiment, the spare touch lines 241 include those which are disposed between the touch electrodes adjacent to each other with respect to the X-axis direction, and which do not overlap the touch electrodes. The touch electrodes overlapping the spare touch line 241 are formed with spare touch line-overlapping openings (slits) overlapping the spare touch line 241. When in a floating state in which no signal is being supplied to the spare touch line 241, in the portion between the touch electrodes adjacent to each other with respect to the X-axis direction or in the vicinity of the spare touch line-overlapping opening, the electric field produced between the common electrode that is a touch electrode and the pixel electrode may possibly become locally unstable. In this respect, the spare touch line 241 is supplied, from the spare touch line terminal portion 55, with the same common signal supplied to the common electrode. Accordingly, it is possible to reduced or eliminate the problem that, in the portion between the touch electrodes adjacent to each other with respect to the X-axis direction or in the vicinity of the spare touch line-overlapping opening, the electric field produced between the common electrode and the pixel electrode becomes unstable locally. Of the touch lines 231 and the lead-out portion of the spare touch line 241, the portions respectively connected to the touch line terminal portions 246 and the spare touch line terminal portions 55 are made of the first metal film 232.

The spare touch line 241, as illustrated in FIG. 12, includes a fold-back portion 56 in which the lead-out portion from the display region AA is folded back on the opposite side of the spare touch line terminal portions 55 from the display region AA (touch electrode) side with respect to the Y-axis direction. Specifically, the fold-back portion 56 is made of the first metal film 232 and is disposed so as to jut out on the opposite side from the display region side with respect to the arrangement group of the touch line terminal portions 246 and the spare touch line terminal portion 55. That is, the fold-back portion 56 is arranged utilizing a vacant space due to the arrangement of the touch testing circuit part 250 outside the mounting region for the driver 212. As described above, a common signal is constantly supplied from the spare touch line terminal portion 55 to the spare touch line 241. Accordingly, when the spare touch line 241 is used for a disconnection repair of the touch lines 231, it is necessary to disable the supply of the common signal to the spare touch line 241. In that case, it is possible to cut the fold-back portion 56 easily by subjecting the fold-back portion 56, jutting out from the arrangement group of the touch line terminal portions 246 and the spare touch line terminal portion 55 and being disposed in the vacant space, to laser light irradiation and the like. In this way, the supply of the common signal to the spare touch line 241 can be disabled. Thus, by connecting the second connection-enabling portion 245 to the spare touch line 241, it becomes possible to supply a touch signal from the spare touch line terminal portion 55 to the spare touch line 241.

The second connection-enabling portion 245, as illustrated in FIG. 12, is disposed between the touch line terminal portions 246 and the touch testing circuit part 250. Specifically, the second connection-enabling portion 245, as illustrated in FIG. 13, is made of a second metal film 235, and a gate insulating film 233 is interposed between the second metal film 235 and the touch lines 231 and lead-out portion of the spare touch line 241 that the second metal film 235 overlaps. The second connection-enabling portion 245 is connected to the spare touch line 241 through the second spare touch line contact hole CH4 formed in the gate insulating film 233. When connecting the second connection-enabling portion 245 to the touch line 231, laser light is irradiated onto the overlapping parts of the touch line 231 and the second connection-enabling portion 245. Then, the insulated state due to the gate insulating film 233 interposed in the overlapping parts of the touch line 231 and the second connection-enabling portion 245 is destroyed, whereby the overlapping parts are short-circuited. In FIG. 13, the portions irradiated with laser light is indicated by a "cross" sign.

As described above, the present embodiment is provided with the spare touch line terminal portion (second signal input portion) 55 which is connected to the other end side of the spare touch line 241 and supplies a common signal to the spare touch line 241. In a floating state in which no signal is being supplied to the spare touch line 241, when, for example, in a configuration in which touch electrodes are arranged side by side where the spare touch line 241 is disposed between the adjacent touch electrodes and the spare touchline 241 does not overlap the touch electrodes, or where, although the spare touch line 241 overlaps the touch electrodes, a slit overlapping the spare touch line 241 is formed in a part of the touch electrodes, an electric field produced between the common electrode that is a touch electrode and a pixel electrode may become unstable locally. In this respect, the same common signal that is supplied to the common electrode is supplied from the spare touch line terminal portion 55 to the spare touch line 241. Accordingly, it becomes possible to reduce or eliminate the problem of the electric field produced between the common electrode and the pixel electrode becoming unstable locally.

The present embodiment is also provided with the touch testing circuit part 250 disposed on the touch electrode side with respect to the touch line terminal portions 246. The touch lines 231 have the other end side thereof connected to the touch line terminal portions 246 via the touch testing circuit part 250. On the other hand, the spare touch line 241 has the other end side thereof extending, via the touch testing circuit part 250, on the side of the touch line terminal portions 246. The second connection-enabling portion 245 is disposed between the touchline terminal portions 246 and the touch testing circuit part 250. In this way, it can be tested, using the touch testing circuit part 250, whether a defect, such as a disconnection, is present in the touch lines 231 or the spare touch line 241 that has been utilized for a disconnection repair. The touch testing circuit part 250 is disposed on the touch electrode side with respect to the touch line terminal portions 246. Accordingly, compared to a case in which the touch testing circuit part 250 were disposed on the opposite side from the touch electrode side with respect to the touch line terminal portions 246, the freedom of arrangement is increased. Using the second connection-enabling portion 245 disposed between the touch testing circuit part 250 and the touch line terminal portions 246, the touch testing circuit part 250 being disposed on the touch electrode side with respect to the touch line terminal portions 246, it is possible to connect the other end side of the touch lines 231 and the other end side of the spare touch line 241.

The present embodiment is also provided with the spare touch line terminal portion 55 which is connected to the other end side of the spare touch line 241 and supplies a signal. The spare touch line 241 has the other end side including the fold-back portion 56 which is folded back on the opposite side from the touch electrode side with respect to the spare touch line terminal portion 55. In this way, it is possible to supply a signal from the spare touch line terminal portion 55 to the spare touch line 241. When one end side of the spare touch line 241 is connected to the touch electrodes by the first connection-enabling portion, and the other end side of the spare touch line 241 is connected to the other end side of the touch lines 231 by the second connection-enabling portion 245, it becomes possible to disable the supply of a signal from the spare touch line terminal portion 55 to the spare touch line 241 by cutting the fold-back portion 56 which is included in the other end side of the spare touch line 241 and folded back on the opposite side from the touch electrode side with respect to the spare touch line terminal portion 55. In this way, it becomes possible to supply a signal from the touch line terminal portions 246 to the touch electrodes via the connection-enabling portion 245 and the spare touch line 241.

Other Embodiments

The technology described herein is not limited to the embodiments described above and with reference to the drawings. The following embodiments may be included in the technical scope.

(1) Other than as described in the embodiments, it is also possible to connect one spare touch line to one touch electrode by two or more first connection-enabling portions. In this way, it becomes possible to reduce the resistance of connection and to increase the probability of success of a repair.

(2) It is also possible to adopt a configuration in which the spare touch line is connected in advance to the first connection-enabling portions, and the touch electrodes are insulated. It is also possible to adopt a configuration in which the touch electrodes and the spare touch line are both insulated with respect to the first connection-enabling portion. In this case, one first connection-enabling portion is subjected to a laser light irradiation process twice.

(3) In the embodiments, it is also possible to adopt a configuration in which the touch lines are connected to the second connection-enabling portion in advance, and the spare touch line is insulated. It is also possible to adopt a configuration in which the touch lines and the spare touch line are both insulated with respect to the second connection-enabling portion. In this case, one second connection-enabling portion is subjected to a laser light irradiation process twice.

(4) Two or more touch lines may be connected to one touch electrode. In this case, a repair using the spare touch line is performed when all of the two or more touch lines connected to one touch electrode have been disconnected. That is, the probability of performing a repair decreases, which is advantageous in terms of manufacturing cost.

(5) It is also possible to constitute the first connection-enabling portion from the first metal film.

(6) It is also possible to constitute the second connection-enabling portion from the third metal film.

(7) Other than as described in the embodiments, the specific planar arrangement, the number provided and the like of the first connection-enabling portions and the second connection-enabling portions may be modified, as appropriate.

(8) A configuration may be adopted in which the source lines and the touch lines are disposed in the same layer and arranged without overlapping each other (such as being arranged at intervals with respect to the X-axis direction). In this case, the first connection-enabling portion is constituted from the first metal film, for example.

(9) A configuration may be adopted in which the touch lines and the touch electrodes are disposed in the same layer. In this case, the touch electrodes and the touch lines being not connected to each other may be separated from each other by a slit disposed therebetween.

(10) In the embodiments, the case has been described in which the processing position indicator has an arrow shape. It is also possible to provide the processing position indicator with a preset touch electrode number and the like, for example. The configuration is preferable when there is an ample space for the processing position indicator, such as when the size of the pixel portion is large.

(11) The processing position indicator may be made of the second metal film or the third metal film. In this case, it is also preferable but not required, from the viewpoint of reducing the arrangement space, to arrange the first connection-enabling portion in a different layer from the processing position indicator in such a way as to overlap each other.

(12) The pixel electrode may be made of the second transparent electrode film, and the common electrode and the touch electrode may be made of the first transparent electrode film.

(13) Other than as described in the embodiments, the specific screen size, resolution and the like of the liquid crystal panel may be modified, as appropriate.

(14) Other than as described in the embodiments, the specific arrangement pitch of the pixel portions in the liquid crystal panel may be modified, as appropriate.

(15) The number of the drivers mounted on the array substrate may be modified, as appropriate.

(16) In the embodiments, the case has been indicated in which the gate circuit parts are disposed on the array substrate. However, the gate circuit parts may be omitted and a gate driver having a function similar to that of the gate circuit parts may be mounted on the array substrate. It is also possible to provide the gate circuit part only at the side part on one side of the array substrate.

(17) In the embodiments, the case has been indicated in which the source testing circuit part and the touch testing circuit part are disposed on the array substrate. It is also possible to omit one or both of the testing circuit parts. Also, the arrangement, the number provided and the like of each of the testing circuit parts may be modified, as appropriate.

(18) Other than as described in the embodiments, the specific planar shape of the pixel overlap opening provided in the common electrode may be modified, as appropriate. It is also possible to adopt a V-shape, a straight-line shape or the like for the planar shape of the pixel overlap opening, for example. The specific number provided, the arrangement pitch and the like of the pixel overlap openings may be modified, as appropriate.

(19) On the array substrate, the TFTs may have a matrix planar arrangement.

(20) In the embodiments, the case has been indicated in which the light shield is disposed on the CF substrate side. However, the light shield may be provided on the array substrate side.

(21) Other than as described in the embodiments, the semiconductor film that constitutes the TFT channel portion may be polysilicon. In this case, it is preferable that the TFTs are of a bottom gate type, or a top-gate type in which a light-shield film is provided in a layer under the channel portion (the side on which the backlight device is mounted).

(22) The touch panel pattern may be of a mutual capacitance type.

(23) In the embodiments, the transmitting-type liquid crystal panel has been described by way of example. However, the technology described herein is also applicable to a reflecting-type liquid crystal panel or a semi-transmitting-type liquid crystal panel.

(24) In the embodiments, the case has been described in which the planar shape of the liquid crystal display device (a liquid crystal panel or a backlight device) is horizontally long rectangular. However, the planar shape of the liquid crystal display device may be vertically long rectangular, square, circular, semi-circular, oval, elliptic, trapezoidal or the like.

(25) The "one end side" and "the other end side" referred to in the embodiments do not necessarily indicate an end of a line, and may indicate a portion closer to the center than the end. The "one end side" indicates the display region side, and "the other end side" indicates the non-display region side relatively closer to the signal input side with respect to the "one end side".

The invention claimed is:
1. A position input device comprising:
 a position detecting electrode that forms a capacitance between the position detecting electrode and a position input body configured to make a position input and detects an input position input by the position input body;
a position detection line having one end side that is connected to the position detecting electrode;
a line that is parallel with the position detection line;
a first connection-enabling portion that is disposed so as to overlap a part of the position detecting electrode and one end side of the line and that is insulated by an insulating film with respect to at least one of the part of the position detecting electrode and the one end side of the line;
a signal input portion connected to another end side of the position detection line; and
a second connection-enabling portion that is disposed so as to overlap the other end side of the position detection line and another end side of the line and that is insulated by an insulating film with respect to at least one of the other end side of the position detection line and the other end side of the line.

2. The position input device according to claim 1, wherein the first connection-enabling portion is connected to the part of the position detecting electrode through a contact hole formed in the insulating film and is insulated by the insulating film with respect to the one end side of the line.

3. The position input device according to claim 2, wherein the position detecting electrode is disposed in a different layer from the position detection line and the line while having an insulating film between the position detection line and the line, and the position detecting electrode includes an opening formed in a position overlapping overlapping parts of the first connection-enabling portion and the one end side of the line.

4. The position input device according to claim 1, wherein the second connection-enabling portion is connected to the other end side of the line through a contact hole formed in the insulating film and is insulated by the insulating film with respect to the other end side of the position detection line.

5. The position input device according to claim 1, further comprising a pixel electrode and a common electrode disposed so as to at least partly overlap the pixel electrode via an insulating film, wherein
the position detecting electrode includes divided parts of the common electrode,
the signal input portion inputs, via the position detection line to the position detecting electrode in a time-division manner, a position detection signal and a common signal placing the position detecting electrode at a reference potential, and
the position detection line and the line are disposed so as to sandwich the pixel electrode.

6. The position input device according to claim 5, further comprising a plurality of signal lines which supply a signal to the pixel electrode and is disposed so as to sandwich the pixel electrode, wherein
the position detection line and the line are disposed in a same layer so as to overlap the plurality of signal lines via an insulating film.

7. The position input device according to claim 6, wherein the first connection-enabling portion is disposed in the same layer as the signal line.

8. The position input device according to claim 7, further comprising a processing position indicator that is disposed adjacent to overlapping parts overlapping via the insulating film at the first connection-enabling portion and at least one of the part of the position detecting electrode and the one end side of the line, and the processing position indicator being arranged overlapping the first connection-enabling portion via an insulating film on an opposite side from the line side.

9. The position input device according to claim 7, further comprising:
a switching element connected to the pixel electrode and the signal line; and
a scan line configured to supply a scan signal to drive the switching element, wherein
a plurality of the pixel electrodes are disposed side by side so as to sandwich the scan lines, and
the first connection-enabling portion is sandwiched between the scan lines and the pixel electrodes and is disposed so as to be sandwiched between two of the signal lines sandwiching the pixel electrodes.

10. The position input device according to claim 9, wherein
the switching element is disposed unevenly so as to be adjacent to one side with respect to the signal line being connected, and
the line includes a protrusion that protrudes toward an opposite side from the switching element side to be connected to the signal line that the line overlaps, and overlaps the first connection-enabling portion, and is insulated from the first connection-enabling portion by the insulating film.

11. The position input device according to claim 5, further comprising a second signal input portion that is connected to the other end side of the line and supplies the common signal to the line.

12. The position input device according to claim 1, further comprising a testing circuit part disposed on an opposite side from a position detecting electrode side with respect to the signal input portion, wherein
the position detection line has the other end side including an extension extending from the signal input portion to the testing circuit part side and being connected to the testing circuit part,
the line has the other end side disposed on the testing circuit part side with respect to the signal input portion, and
the second connection-enabling portion is disposed between the signal input portion and the testing circuit part and is disposed so as to overlap the extension and the other end side of the line.

13. The position input device according to claim 1, further comprising a testing circuit part disposed on the position detecting electrode side with respect to the signal input portion, wherein
the position detection line has the other end side connected to the signal input portion via the testing circuit part, whereas the line has the other end side extending on the signal input portion side via the testing circuit part, and
the second connection-enabling portion is disposed between the signal input portion and the testing circuit part.

14. The position input device according to claim 13, further comprising a second signal input portion that is connected to the other end side of the line and supplies a signal,
wherein the line has the other end side including a fold-back portion which is folded back on the opposite side from the position detecting electrode side with respect to the second signal input portion.

15. The position input device according to claim 1, further comprising a plurality of the position detecting electrodes and a plurality of the first connection-enabling portions, wherein the plurality of the position detecting electrodes and the plurality of the first connection-enabling portions are disposed side by side with the line sandwiched therebetween, and the line has the one end side including a first overlapping portion overlapping one adjacent first connection-enabling portion of the plurality of the first connection-enabling portions, and a second overlapping portion overlapping another adjacent first connection-enabling portion of plurality of the first connection-enabling portions.

* * * * *